US010330904B2

(12) United States Patent
Kapanidis et al.

(10) Patent No.: US 10,330,904 B2
(45) Date of Patent: Jun. 25, 2019

(54) COMPACT MICROSCOPE

(71) Applicant: ISIS INNOVATION LTD., Summertown, Oxford Oxfordshire (GB)

(72) Inventors: Achillefs Kapanidis, Summertown (GB); Bo Jing, Summertown (GB); Robert Crawford, Summertown (GB)

(73) Assignee: Oxford University Innovation Limited, Oxford (GB)

( * ) Notice: Subject to any disclaimer, the term of this patent is extended or adjusted under 35 U.S.C. 154(b) by 144 days.

(21) Appl. No.: 15/031,807

(22) PCT Filed: Oct. 27, 2014

(86) PCT No.: PCT/IB2014/065639
§ 371 (c)(1),
(2) Date: Apr. 25, 2016

(87) PCT Pub. No.: WO2015/059682
PCT Pub. Date: Apr. 30, 2015

(65) Prior Publication Data
US 2016/0266362 A1    Sep. 15, 2016

(30) Foreign Application Priority Data

Oct. 25, 2013 (GB) .................................. 1318919.6

(51) Int. Cl.
*G02B 21/00* (2006.01)
*G02B 21/24* (2006.01)
(Continued)

(52) U.S. Cl.
CPC ..... *G02B 21/0008* (2013.01); *G02B 21/0088* (2013.01); *G02B 21/06* (2013.01);
(Continued)

(58) Field of Classification Search
CPC ........................ G02B 21/0008; G02B 21/0088; G02B 21/06; G02B 21/244; G02B 21/26; G02B 21/36
See application file for complete search history.

(56) References Cited

U.S. PATENT DOCUMENTS 4,893,914 A    1/1990   Hancock et al.
7,897,942 B1 *  3/2011   Bareket ............... G03F 7/70783
                                                    250/398
(Continued)

FOREIGN PATENT DOCUMENTS

EP    1666947 A2    6/2006
GB    2299236 A    9/1996
(Continued)

OTHER PUBLICATIONS

Office Action, JP 2014-80071321.9, dated Nov. 16, 2018 (English translation attached) (16 pp.).
(Continued)

*Primary Examiner* — Thai Q Tran
*Assistant Examiner* — Sunghyoun Park
(74) *Attorney, Agent, or Firm* — Eversheds Sutherland (US) LLP

(57) ABSTRACT

A compact microscope including an enclosure, a support element, a primary optical support element located within the enclosure and supported by the support element, at least one vibration isolating mount between the support element and the primary optical support element, an illumination section, an objective lens system, a sample stage mounted on the primary optical support element, an illumination optical system to direct an illumination light beam from the illumination section to the sample stage, and a return optical system to receive returned light from sample stage and transmit returned light to a detection apparatus, wherein the (Continued)

illumination optical system and return optical system are mounted on the primary optical support element.

19 Claims, 24 Drawing Sheets

(51) Int. Cl.
  *G02B 21/06* (2006.01)
  *G02B 21/26* (2006.01)
  *G02B 21/36* (2006.01)

(52) U.S. Cl.
  CPC ............ *G02B 21/244* (2013.01); *G02B 21/26* (2013.01); *G02B 21/36* (2013.01)

(56) References Cited

U.S. PATENT DOCUMENTS

| | | | | |
|---|---|---|---|---|
| 2003/0103662 | A1* | 6/2003 | Finkbeiner | G01N 21/253 382/128 |
| 2004/0085627 | A1* | 5/2004 | Okamura | A61B 3/132 359/385 |
| 2005/0105172 | A1 | 5/2005 | Hasegawa et al. | |
| 2008/0192339 | A1* | 8/2008 | Kubo | G02B 21/0032 359/385 |
| 2008/0247038 | A1* | 10/2008 | Sasaki | G02B 21/0024 359/395 |
| 2010/0033811 | A1 | 2/2010 | Westphal et al. | |
| 2011/0051232 | A1 | 3/2011 | Steinborn et al. | |
| 2014/0233098 | A1* | 8/2014 | Bresolin | G02B 21/0016 359/392 |

FOREIGN PATENT DOCUMENTS

| | | |
|---|---|---|
| JP | H11149045 A | 6/1999 |
| JP | 2001311866 A | 11/2001 |
| JP | 2003241079 A | 8/2003 |
| JP | 2006162765 A | 6/2006 |
| JP | 2007127524 A | 5/2007 |
| JP | 2007183435 A | 7/2007 |
| JP | 2008225454 A | 9/2008 |
| JP | 2013156510 A | 8/2013 |
| WO | WO2007144197 A1 | 12/2007 |

OTHER PUBLICATIONS

Notice of Reasons for Refusal, JP 2016-549653, dated Oct. 30, 2018 (English translation attached) (11 pp.).

* cited by examiner

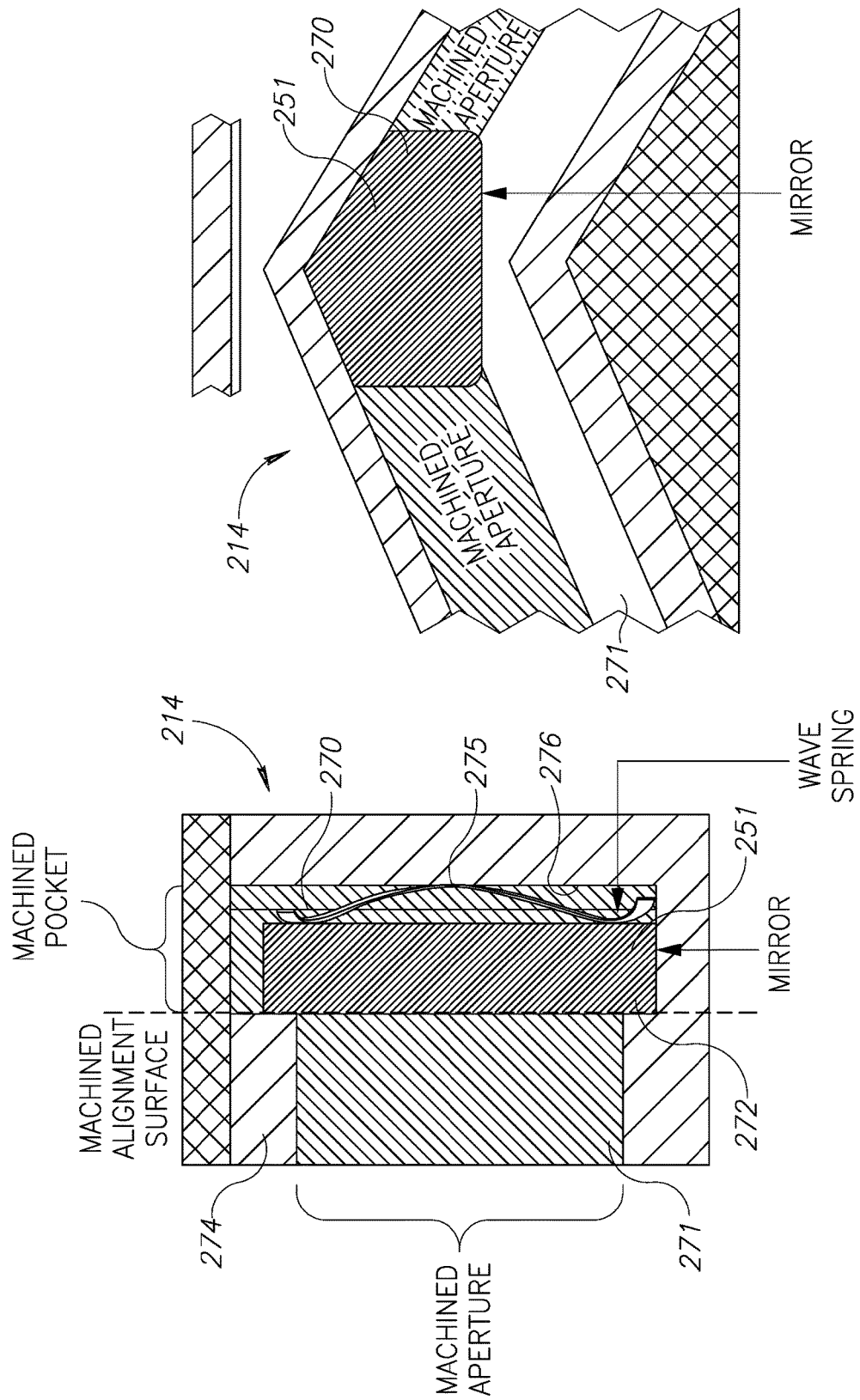

COMPACT MICROSCOPE

This application relates to a compact microscope, a system including a compact microscope and an illumination source module, a microscope focus control system and a method of controlling a microscope focus.

BACKGROUND TO THE INVENTION

Optical microscopy and spectroscopy includes a large number of techniques and applications. Example techniques include differential interference contrast, phase contrast and dark field microscopy, absorption microscopy, coherent interferometric microscopy, Raman spectroscopy and microscopy, and fluorescence based techniques, such as fluorescence resonance energy transfer (FRET) spectroscopy, fluorescence life-time imaging, fluorescence polarization and anisotropy microscopy, multi-colour, alternating-laser excitation microscopy, single-particle localization and structured illumination based super-resolution microscopy.

For many applications, the microscope system must be extremely stable, protected from vibration and other external influences, precisely aligned and controlled, able to detect extremely weak signals, and safe to operate. Commercially available systems and bespoke microscopy systems for specific applications can be expensive and have large dimensions and weight, and are consequently not portable, while requiring substantial infrastructure, maintenance costs, operator training and custom software, and a consequent substantial total cost of ownership.

SUMMARY OF THE INVENTION

According to a first aspect of the invention there is provided a compact microscope comprising an enclosure, a support element, a primary optical support element located within the enclosure and supported by the support element, at least one vibration isolating mount between the support element and the primary optical support element, a sample stage mounted on the primary optical support element, and a return optical system to receive returned light from sample stage and transmit returned light to a detection apparatus, wherein the return optical system is mounted on the primary optical support element.

The compact microscope may have an objective lens system mounted on the primary optical support element.

The compact microscope may further comprise an illumination section and an illumination optical system to direct an illumination light beam from the illumination section to the sample on the sample stage, wherein the illumination optical system is mounted on the primary optical support element.

At least part of the illumination optical system and the return optical system may be located in different planes of the compact microscope. Preferably the different planes are separated by an opaque part of the primary optical support element or a secondary optical support element.

The detection apparatus may be supported by the primary optical support element.

At least part of the illumination optical system and the return optical system may comprise a secondary optical support element supported by the primary optical support element.

The illumination section may comprise a connection to receive an optical fibre connected to a light source.

The detection apparatus may comprise a photodetector.

The detection apparatus may comprise an imaging apparatus.

The illumination section may comprise a power meter.

The illumination optical system may comprise beam shaping optics to control the shape of an illumination light beam.

The illumination optical system may comprise at least one aperture to control the shape of an illumination light beam.

The return optical system may be operable to separate returned light into at least a first wavelength band and a second wavelength band.

Where the compact microscope comprises an imaging apparatus, the return optical system may direct returned light in a first wavelength band to a first area of the imaging apparatus and returned light in a second wavelength band to a second area of the imaging apparatus.

The sample stage may be moveable.

The compact microscope may further comprise a focus stability beam optical system to direct a focus stability beam to the objective lens system.

The compact microscope system may comprise a focus controller operable to receive a reference image of the focus stability beam from the objective lens system, receive a subsequent image of the focus stability beam, and control the sample stage in accordance with the reference image and subsequent image.

Where the illumination light beam is pulsed, the subsequent image may be obtained between pulses of the illumination light beam.

According to a second aspect of the invention there is provided a microscope system comprising a compact microscope according to the first aspect of the invention and an illumination source module, the illumination optical system of the compact microscope and the illumination source module being connected by an optical fibre.

The illumination source module may comprise a laser source.

The illumination source module may comprise a first laser source to generate a first illumination light beam having a first wavelength and a second laser source to generate a second illumination light beam having a second wavelength, and a beam combination optical system to transmit the first illumination light beam and second illumination light beam to the optical fibre.

The illumination source module may comprise a focus stability beam laser source and a focus stability beam optical fibre to transmit the focus stability beam to the compact microscope.

According to a third aspect of the invention there is provided a microscope focus control system comprising a movable sample stage, an objective lens system, a focus stability beam optical system to direct a focus stability beam to the objective lens system, an imaging apparatus, a return optical system to return light to the imaging apparatus, and a control system having a reference image of the focus stability beam from the objective lens system, the control system being operable to receive a subsequent image of the focus stability beam, and control the sample stage in accordance with the reference image and subsequent image.

The control system may be operable to control the sample stage such that a subsequent image matches the reference image.

According to a fourth aspect of the invention there is provided a method of controlling a microscope focus, comprising storing a reference image of a focus stability beam, transmitting a focus stability beam to an objective lens system of a microscope, receiving a subsequent image of the focus stability beam, and controlling a sample stage of the microscope in accordance with the reference image and subsequent image.

The method may comprise controlling the sample stage such that a subsequent image matches the reference image.

BRIEF DESCRIPTION OF THE DRAWINGS

An embodiment of the invention is described by way of example only with reference to the accompanying drawings, wherein;

FIG. 11a is a sectional view of an integral mirror mount of the compact microscope of FIGS. 7a and 7b, FIG. 11b is a sectional view of a further integral mirror mount of the compact microscope of FIGS. 7a and 7b.

DETAILED DESCRIPTION OF THE PREFERRED EMBODIMENTS

Figure 1:
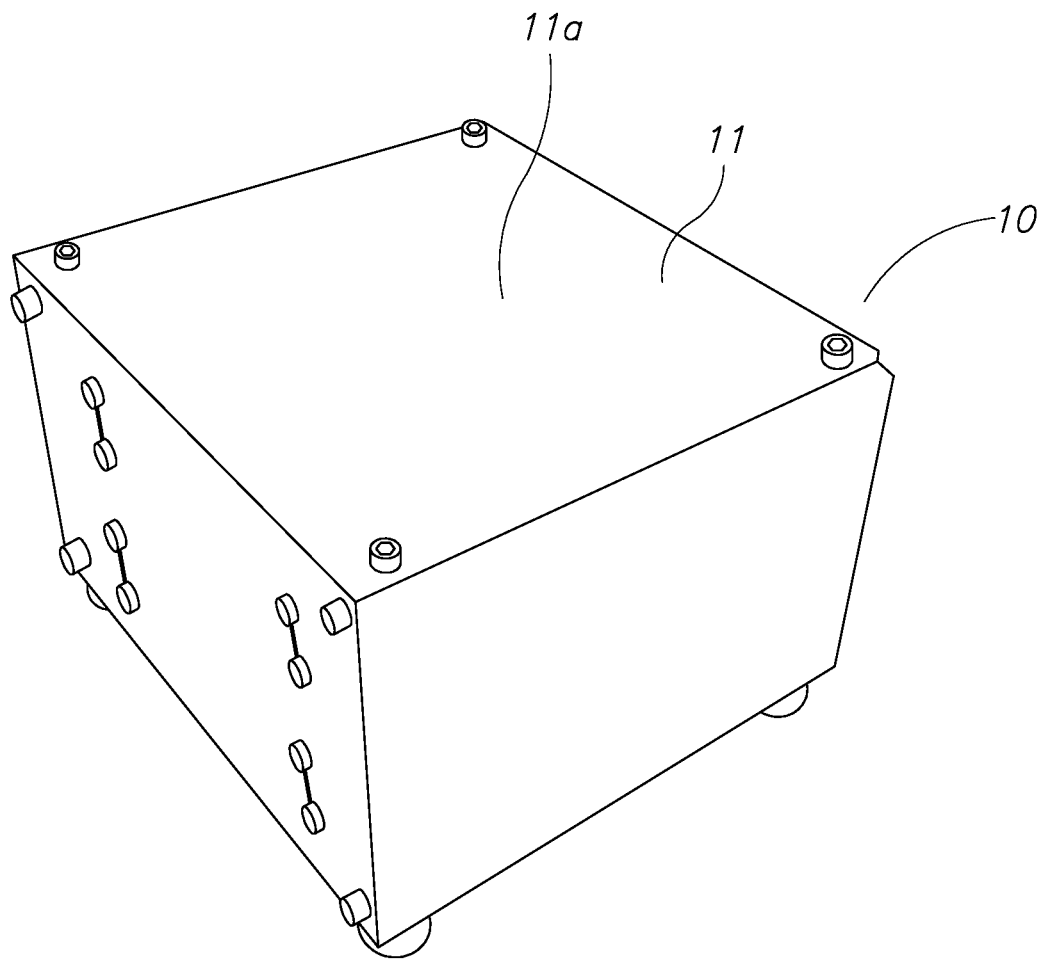
FIG. 1 is a perspective view of a compact microscope embodying the present invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

First Example

A compact microscope embodying the present application is generally shown at 10 in FIG. 1. The microscope 10 has an enclosure 11, completely enclosing the optical paths of the microscope. The enclosure 11 comprises a hatch 11a to provide access to a sample stage as described below. Preferably the side and top walls of the enclosure 11 are removable to allow access to the components within the microscope 10. In this example, the enclosure 11 is extremely compact, having a length of 24 cm, a depth of 21.5 cm and a height of 15 cm, giving the microscope a footprint area approximately that of an A4 sheet of paper, and a volume of about 8 liters. It is envisaged that further reduction of the unused space within the enclosure 11 would allow the size of the microscope could be reduced further, to 23 cm×16 cm×15 cm without other major design changes, and may be even further minimised with suitable design of the components and optical paths. The portability allows the microscope to be easily repositioned or relocated, or even located in a controlled environment such as a refrigerator, or an incubator with special atmospheric compositions, for example controlled levels of $CO_2$ for pH-sensitive mammalian cell cultures.

The hatch 11a may be interlocked to cut off the illumination section or prevent its operation when the hatch is open. Providing that the enclosure 11 prevents the escape of light from within the microscope, the microscope can therefore be a Class I laser product and therefore may be used anywhere, and not restricted to for example laser controlled areas.

Figure 2:
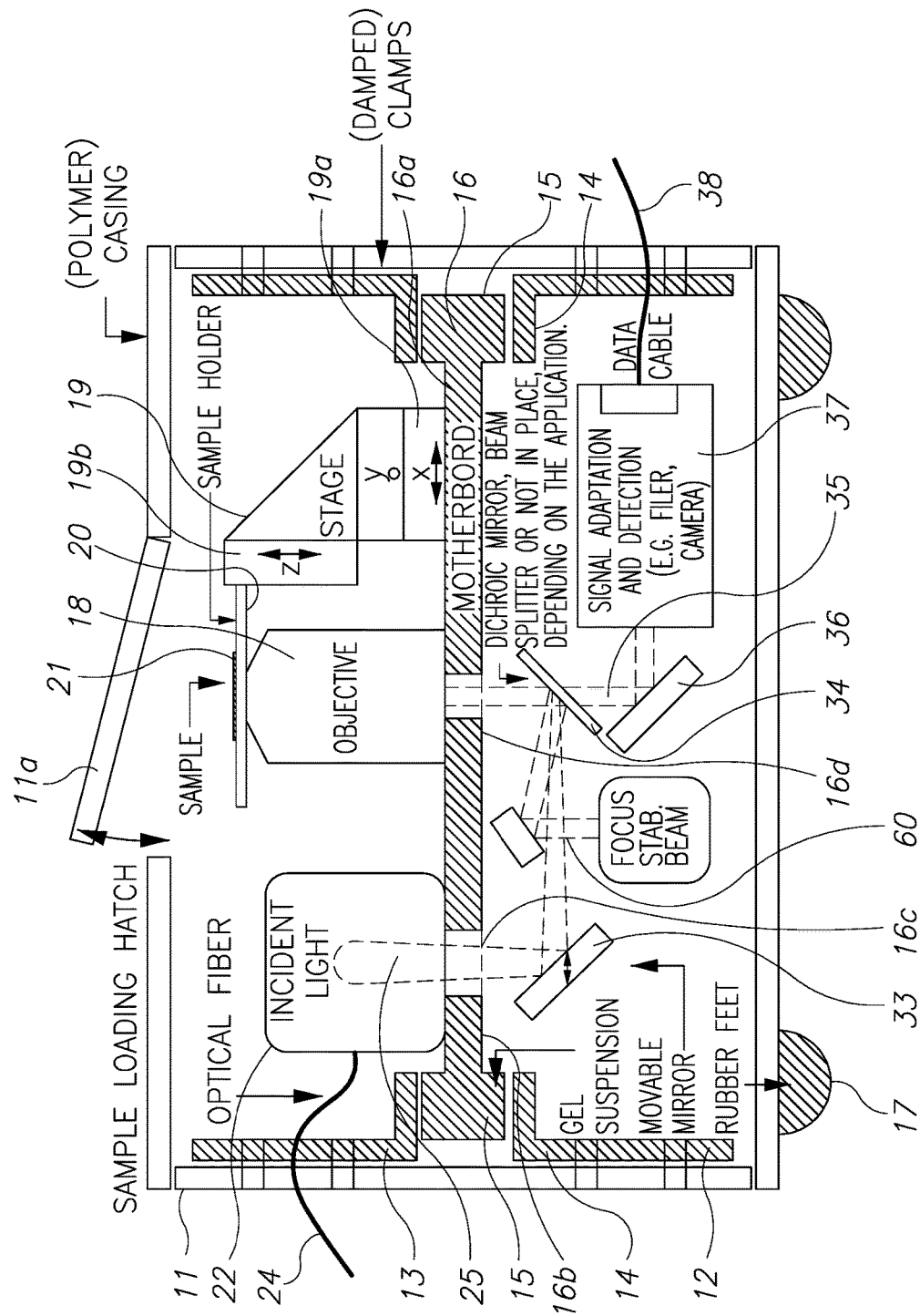
FIG. 2 is a diagrammatic sectional view of the compact microscope of FIG. 1.

A sectional view of the microscope 10 is shown in FIG. 2. Located within the enclosure 11 is a support element generally shown at 12. In this example, the support element 12 comprises a plurality of uprights 13 with mount holders 14 generally at the midpoints of uprights 13. Although the support element 12 is a discrete structure in this example, the support element could be provided integrally with the enclosure 11.

To support the optical components, a primary optical support element 16 is provided. The primary optical support element 16 is preferably a single contiguous and compact piece of dimensionally stable material, for example an aluminium, titanium or Invar block, fabricated from carbon fibre or otherwise. The primary optical support element 16 in this example is a generally rectangular plate, although any other geometry or irregular shape may be used as appropriate, for example to accommodate other components or systems within the enclosure 11. The primary optical support element 16 may also be cast or machined with holders for the optical components already in place or integrally provided, to increase stability and reduce the possibility of misalignment of the components.

The primary optical support element 16 is supported on uprights 13 through vibration isolating mounts 15 held in the mount holders 14 of the uprights 13. In this example, the vibration isolating mounts 15 comprise gel polymer patches, but any suitable mount may be used, to provide adequate vibration isolation. In addition, the enclosure 11 is provided with rubber feet 17 to engage a supporting surface, to further reduce transmitted vibrations. If desired, other vibration isolation components may be provided, or indeed the enclosure 11 and/or the support element 12 or parts thereof may comprise vibration isolating material. As shown in the alternative of FIG. 2b, a primary optical support element 16' is supported on gel-coated titanium rods 15' which are received in channels 16a' in the primary optical support element 16'. The ends 15a' of the rods 15' are received in rubber mounts 17' supported in recesses 18' on the internal face of enclosure 12'. In a further alternative, the primary optical support element may be supported by active vibration isolation components, such as regulated air pistons.

In this example, the gel polymer patches 15 act as a low-pass damping material with a frequency cut-off of approximately 10 Hz. The length and width of the primary support structure 16 is chosen to be small while keeping a moderate thickness of the material to push modal frequencies to well above 1 kHz, for example if aluminium is used for the primary support structure. The camera in this embodiment has a full frame readout frequency of 100 Hz. Therefore, due to the different order of magnitude of these characteristic frequencies, external forces do not efficiently excite any modal frequencies, and the amplitude of any excitations are small due the high modal frequencies, and any vibrations at the modal frequencies are inconsequential for the data acquisition time scale of the camera.

As is apparent from FIG. 2, components may be mounted on opposite sides of the primary optical support element 16. The primary optical support element has a first, uppermost side 16a and a second, lowermost side 16b. Mounted on the first, uppermost side 16a are an objective lens system 18 and a sample stage 19. The sample stage 19 is positioned to support a sample holder 20 above the objective lens 18 to enable a sample 21 to be imaged. The sample stage 19 has a transverse positioner 19a, to allow the sample 21 to be moved in the x-y plane, and a z-axis positioner 19b to enable the sample holder 20 to be moved vertically relative to the objective lens system 18. The positioners 19a, 19b are preferably piezoelectric friction drives which have low mechanical drift and backlash, and may be controlled automatically with nanometer precision over relatively large distances (several cm), allowing a large number of areas of a sample to be imaged. Piezoelectric friction drives allow nanometer scale steps to be made, the steps being in the range of approximately 1 to 100 nm depending on the drive used. This makes the microscope suitable for automated operation, where the transverse position is operable to successively bring different areas of the sample into the field of view of the objective lens to automatically take a large number of measurements. In addition to focusing the microscope, control of the z-axis position also allows measurements to be taken on different planes, for example through a cell.

Figure 2A:
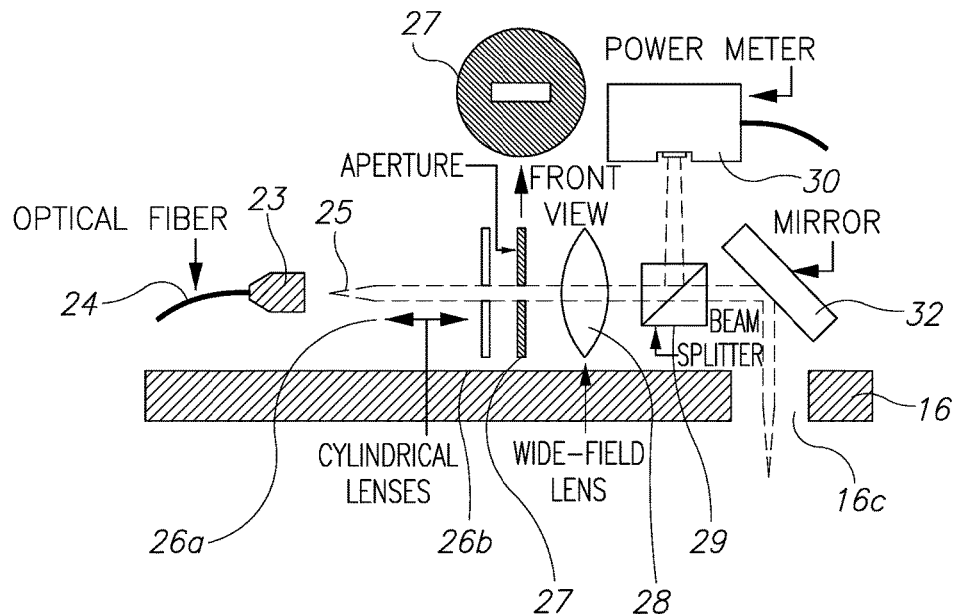
FIG. 2a is an illustration of an illumination section of the compact microscope of FIG. 2.
Figure 2B:
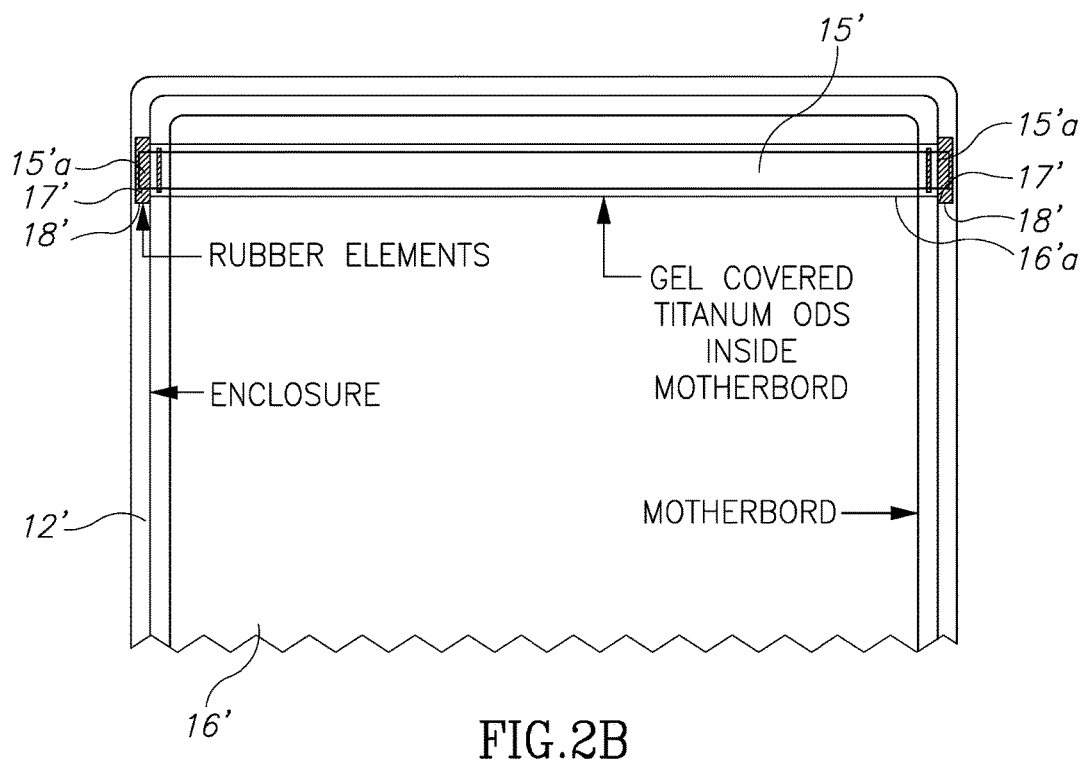
FIG. 2b is a plan view of an alternative support for a primary optical support element for the compact microscope of FIG. 1.

An illumination section is generally shown at 22 and in more detail in FIG. 2a, mounted on the first side 16a of the primary optical support element 16. The illumination section 22 may comprise a laser, an LED or a lamp, or multiple sources, or, as in this example, may include a connection to receive an optical fibre for connection to a separate illumination source module. By using a separate illumination source module, the microscope can be adapted for different techniques or applications by providing different sources. As shown in FIG. 2a, optical fibre connector 23 receives and holds optical fibre 24. Illumination light beam 25 is passed through cylindrical lenses 26a, 26b to shape and collimate the beam. Adjustable aperture 27 shapes the beam further, and wide field lens 28 then provides a converging beam focused on the rear focal plane of the objective lens system 18. Beam splitter 29 diverts approximately <10% of the light to power meter 30 to allow the beam power to be monitored and noise in the resulting data caused by beam intensity fluctuations to be lowered. Mirror 32 then directs the illumination light beam 25 through aperture 16c. As discussed below, for some applications it is desirable to adjust or replace the lens 28 to provide a collimated or divergent illumination beam, or an illumination beam focused at some other point in the optical path.

On the second, lower side 16b of primary optical support element 16, mirrors 33, 34 direct the illumination light beam 25 through aperture 16d to the objective lens system 18, where the illumination light beam 25 is focused on the back focal plane of the objective lens system 18 for wide field imaging to evenly illuminate the sample 21, or is focused on sample 21 by the objective lens system 18 via collimated light entering the back aperture of the objective lens system 18, for confocal microscopy. The illumination section 22, and mirrors 33, 34 are referred to collectively as the illumination optical system. For other applications, other components may be used in the illumination optical system. For example, mirror 34 may be a dichroic mirror, a beam splitter, a miniaturized mirror, or omitted completely. The mirror 33 can be moveable or translatable to change the illumination angle, for example for total internal reflection microscopy.

Returned light from the sample 21 is generally shown at 35. The returned light passes through mirror 34. If mirror 34 is a dichroic mirror, the characteristics of the dichroic mirror 34 are selected such that the wavelengths or wavelength range of the illumination light beam 25 are reflected, but returned light passes through. After mirror 34, the returned light is directed by mirror 36 to detection apparatus 37. Detection apparatus 37 includes a suitable detector or camera (or more than one detector or camera as needed) and the appropriate optical components for the required application. The detection apparatus has a connection 38 to allow data to be transmitted to a control system or computer. The optical components to direct returned light to the detection apparatus, and the optical components within the detection apparatus, are collectively referred to as a return optical system. For other applications, other components may be used in the return optical system.

In this example, by mounting the components on a single primary optical support element, close to the primary optical support element surface, and supporting the primary optical support element on vibration isolating mounts, the microscope has greatly reduced susceptibility to external forces and variations in temperature and other ambient conditions. Use of both sides of the primary optical support element for the optical paths, and using a beam height close to the primary optical support element surface, enables the components to be included in a relatively compact volume. In the present example, the beam heights are between about 10 mm and about 30 mm from the primary optical support element surface. Mounting the objective lens and sample holder on one side of the primary optical support element and at least part of the illumination and return optical systems on the opposite side reduces spurious optical reflections from entering the return beam path. The location of optics on both sides of the primary optical support element allows all components to remain accessible.

Figure 3A:
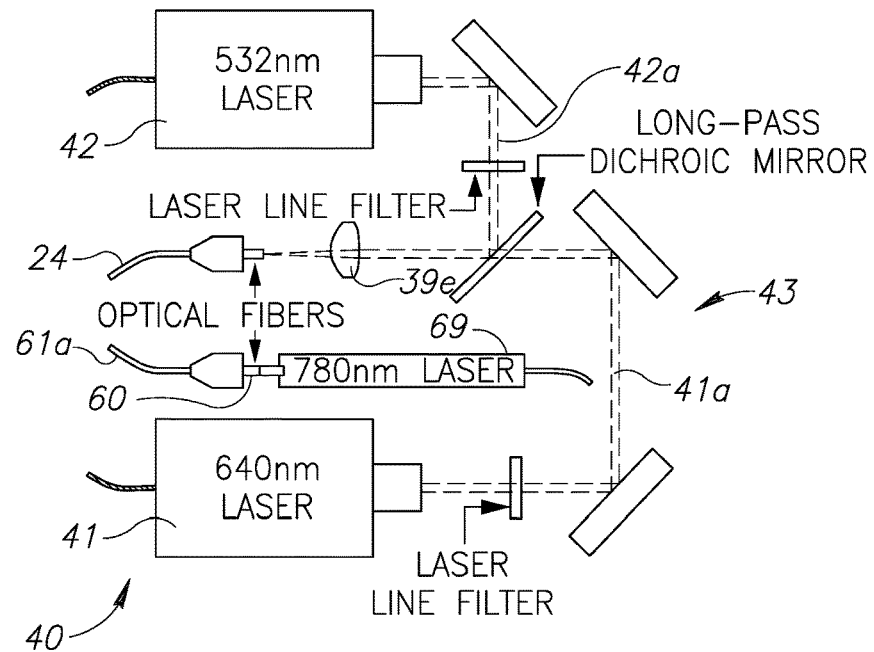
FIG. 3a is a diagrammatic illustration of an illumination source module for use with the compact microscope of FIG. 1, FIGS. 3b and 3c are alternative examples of return light paths for dual-colour wide-field fluorescence microscopy, FIG. 4. is a perspective view of beam paths within the compact microscope of FIG. 1 for use in dual-colour wide-field fluorescence microscopy.
Figure 3B:
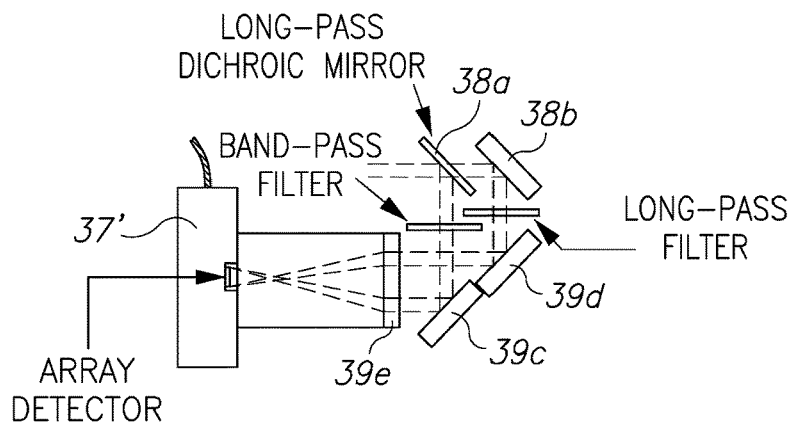
Figure 3C:
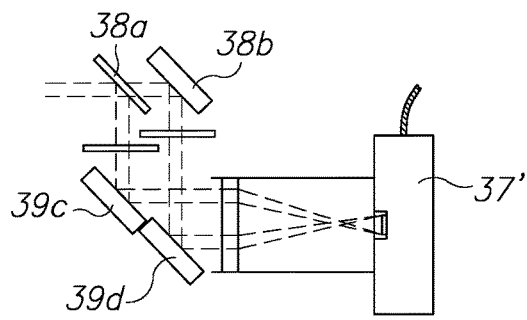
Figure 4:
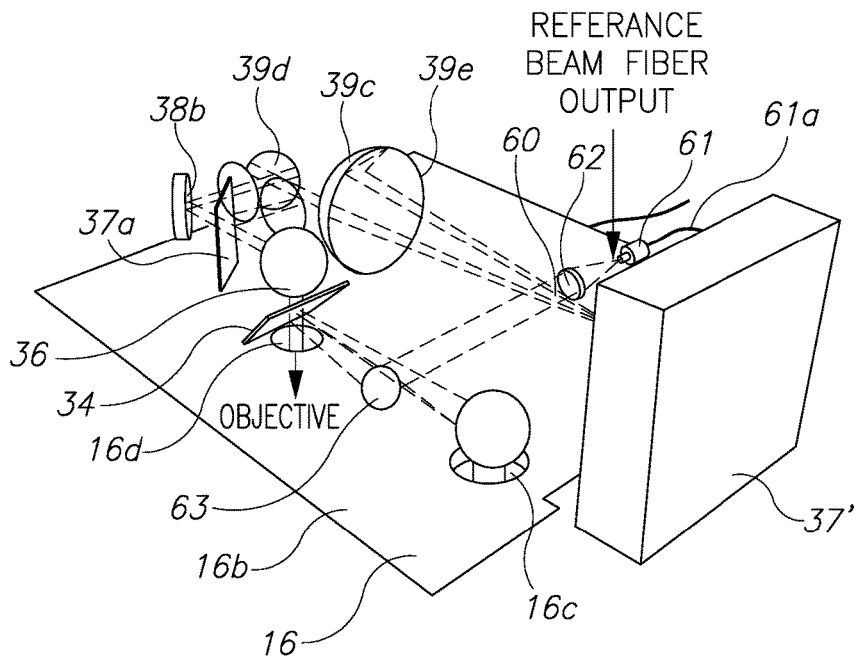
Figure 5:
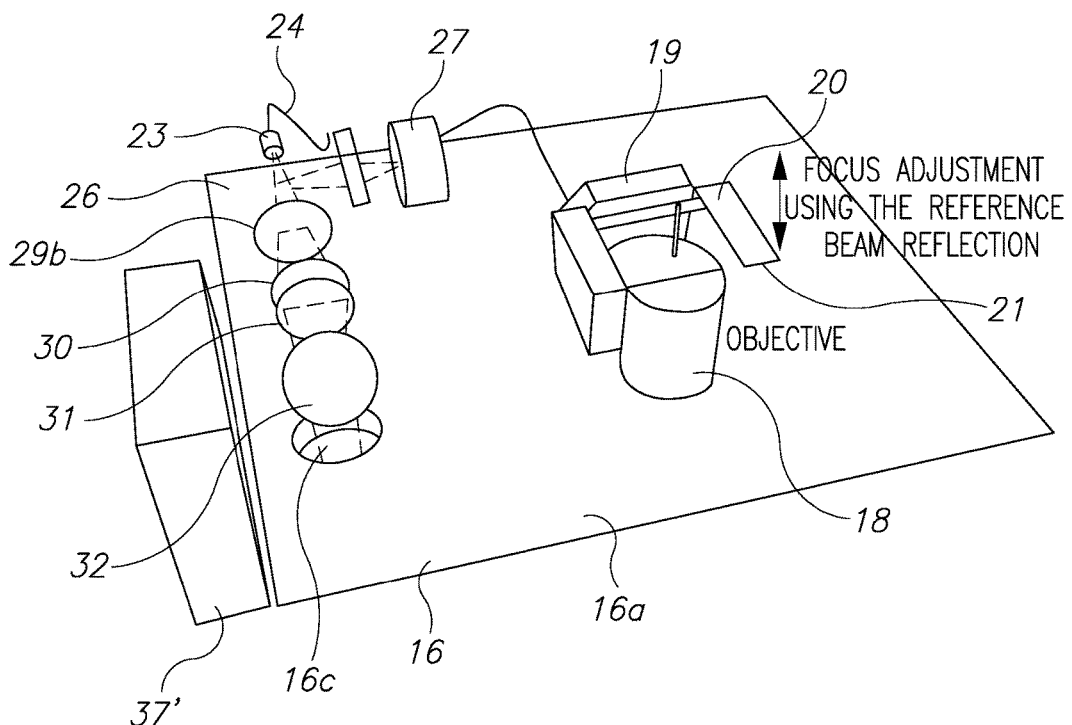
FIG. 5 is a perspective view of further beam paths within the compact microscope of FIG. 4.
Figure 6:
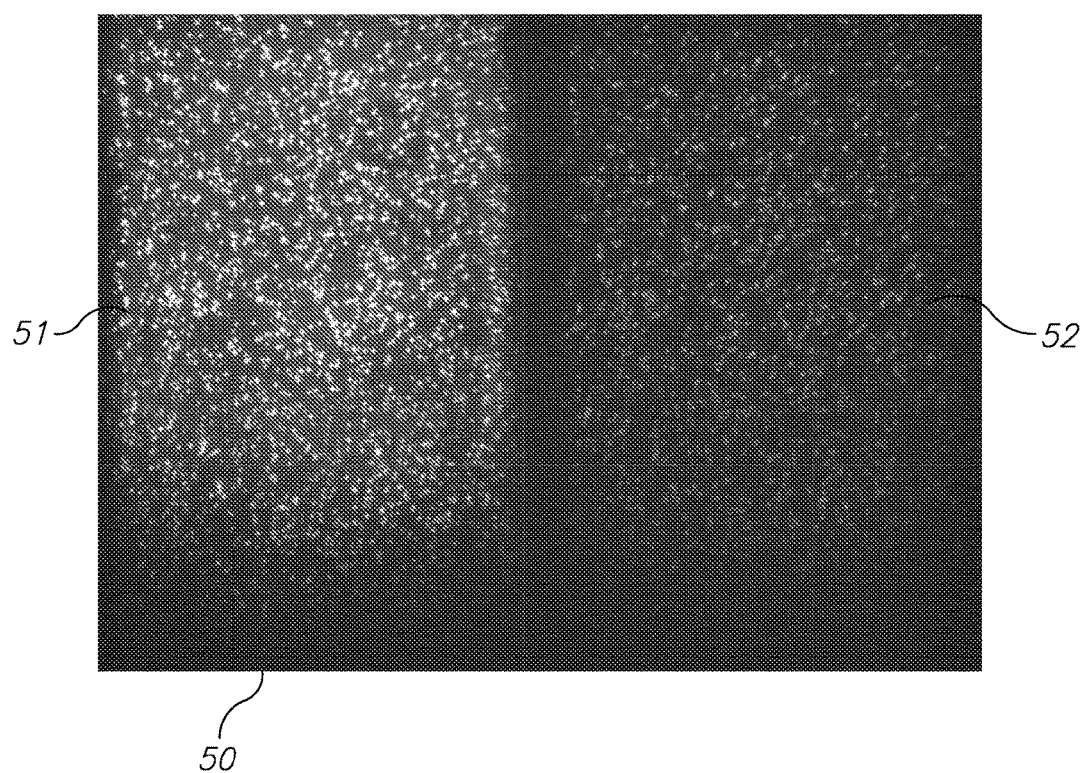
FIG. 6 is an example of an image formed at the imaging apparatus in the compact microscope of FIGS. 4 and 5, FIGS. 7a and 7b are perspective view of another compact microscope embodying the present invention.

The configuration shown in FIGS. 2 and 2a is a general configuration and may be adapted for use with a desired microscopy technique. By way of example, a configuration for a dual-colour wide-field fluorescence microscope will now be described with reference to FIGS. 3a to 6. FIG. 3a is a diagram of an illumination source module, FIGS. 3b and 3c show alternative simple return optical systems, and FIGS. 4 and 5 are perspective views of the beam paths within the microscope 10. Elements equivalent to those in FIGS. 2 and 2a are labelled with the same reference number.

In dual-colour wide-field fluorescence microscopy, sample 21 is labelled with fluorescent molecules which absorb light at one of two excitation wavelengths and then fluoresce. The illumination light beam is thus more accurately regarded as an excitation light beam in this embodiment.

As seen in FIG. 3a, an illumination source module is generally shown at 40. The illumination source module 40 comprises a first laser source 41 to generate a first illumination light beam 41a having a first wavelength and a second laser source 42 to generate a second illumination light beam 42a having a second wavelength. A beam combination optical system 43 combines the first illumination light beam 41a and second illumination light beam 42a and couples the light into the optical fibre 24. In this example the first wavelength is 640 nm and the second wavelength is 532 nm. The illumination light beams 41a, 42a may be pulsed for alternating laser excitation microscopy, with the pulses timed so that the pulses of the beams do not overlap. Optionally, the illumination source module 40 may have a power meter in place of, or in addition to, power meter 27. FIG. 3a also shows a focus stability beam source 59 for generating a focus stability beam 60, coupled into single-mode optical fibre 61a as discussed in more detail below. For dual-colour microscopy, both illumination beams may be on simultaneously. Excitation clean-up filters are located in the beam lines to pass only the main illumination laser wavelengths.

The detection apparatus in FIGS. 3b to 5 comprises a 2D camera, in this example a CMOS camera 37', although a CCD or EMCCD camera may be used depending on the application. The return optical path comprises optical elements to separate the returned light by wavelength. As shown in FIG. 5, the illumination optical path is substantially as shown in FIG. 2a.

The path of the return light is illustrated in FIGS. 3b and 4. Returned light passes through mirror 34, in this application a dichroic mirror, and is directed by mirror 36. The beam then passes through separation dichroic mirror 38a. The separation dichroic mirror 38a reflects the green fluorescence light with wavelength in the range 545 nm-620 nm in the returned light. The red wavelengths >656 nm pass through and are reflected by mirror 38b. The red and green returned light beams are directed to different areas of the CMOS camera 37'. In the examples of FIGS. 3b and 4, the green and red beams are separately reflected towards the CMOS camera 37' by separate mirrors 39c, 39d, through focusing lens 39e. The green and red beams in this example cross each other before the camera 37', so that the beams go through the lens 39e closer to its centre, causing less aberration. The mirrors 38a, 38b, 39c, 39d allow the controllable positioning of the images on different areas of the CMOS camera 37'. An example of a frame obtained by the CMOS camera 37' is shown at 50 in FIG. 6, with an image 51 corresponding to one wavelength or wavelength range at the left of the frame and an image 52 corresponding to the other wavelength or wavelength range at the right of the frame. In this example the signals in the red channel on the right show less bright signals as the image shows weak fluorescence resonance energy transfer from "green" fluorophores to "red fluorophores. Separation of returned light into different wavelength bands and different areas of a detector enables a mix of techniques to be used simultaneously, such as scattering and fluorescence. The use of emission clean-up filters blocks light at the illumination laser wavelengths from reaching the detection apparatus.

An alternative configuration of the mirrors 39c, 39d, lens 39e and CMOS camera 37' is shown in FIG. 3c, in which the optical paths proceed generally left to right as seen in the Figure, as opposed to the reflection of 180° shown in FIG. 3b. The Figures are intended to illustrate that different optical paths may be selected, depending on the most efficient way of arranging optical paths and components on the primary optical support element 16 to obtain a compact system.

Second Example

Figure 7A:
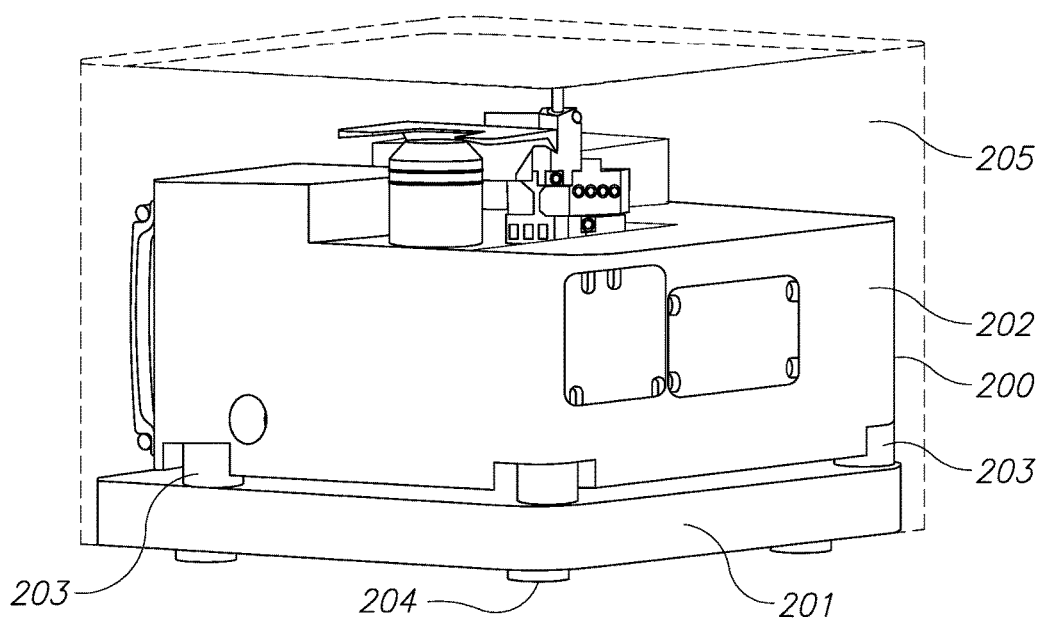
Figure 7B:
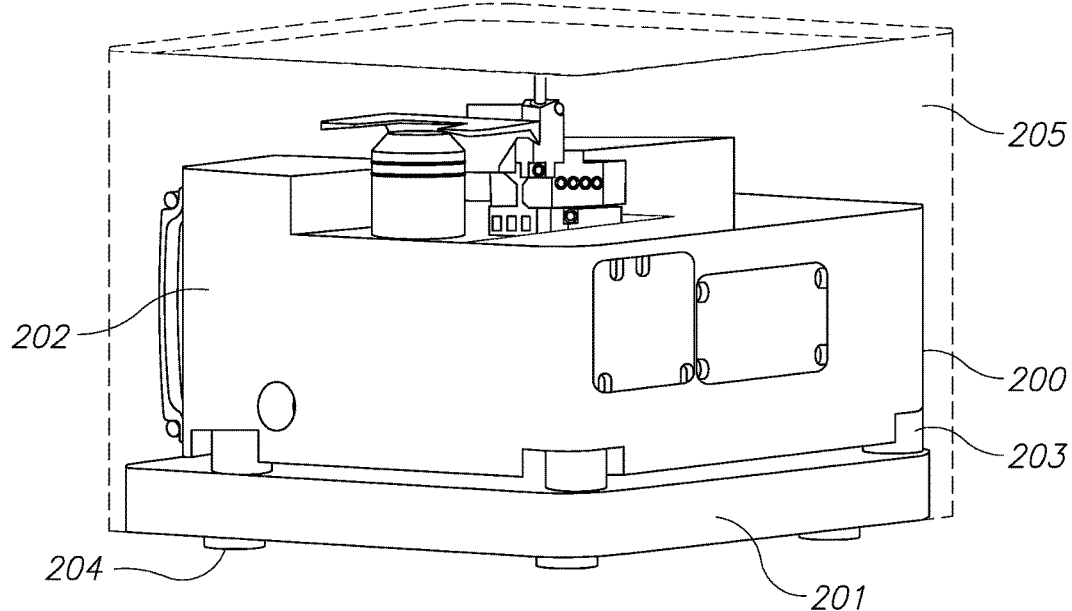
Figure 8A:
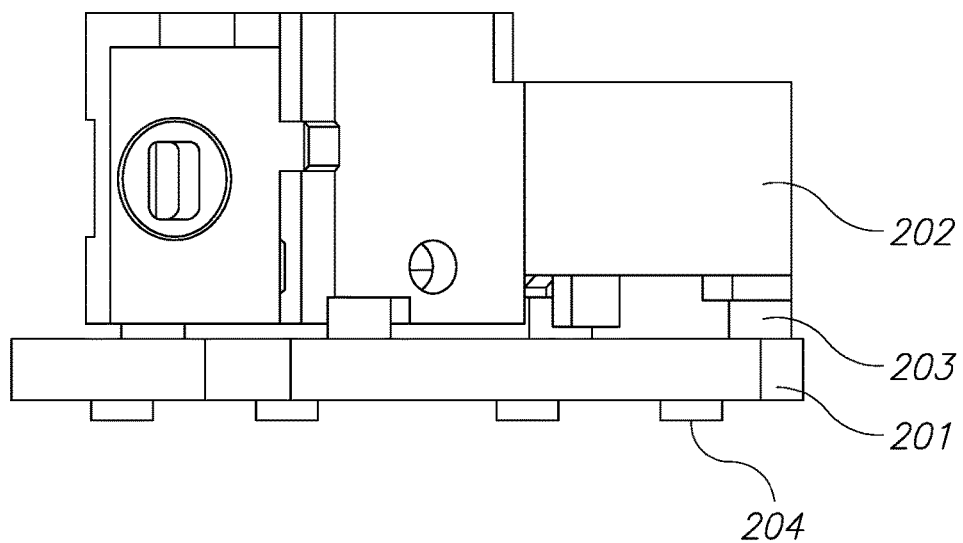
FIGS. 8a to 8d are perspective views of a primary optical support element of the compact microscope of FIGS. 7a and 7b, FIGS. 9a to 9d are diagrammatic views of the configuration of the compact microscope of FIGS. 7a and 7b.
Figure 8B:
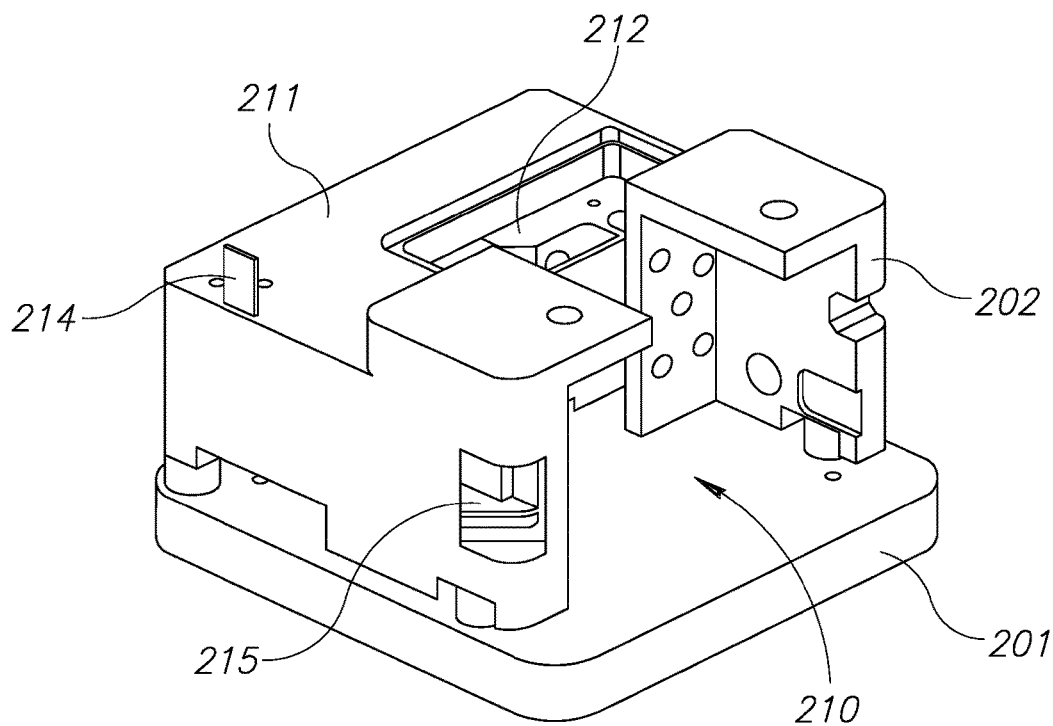
Figure 8C:
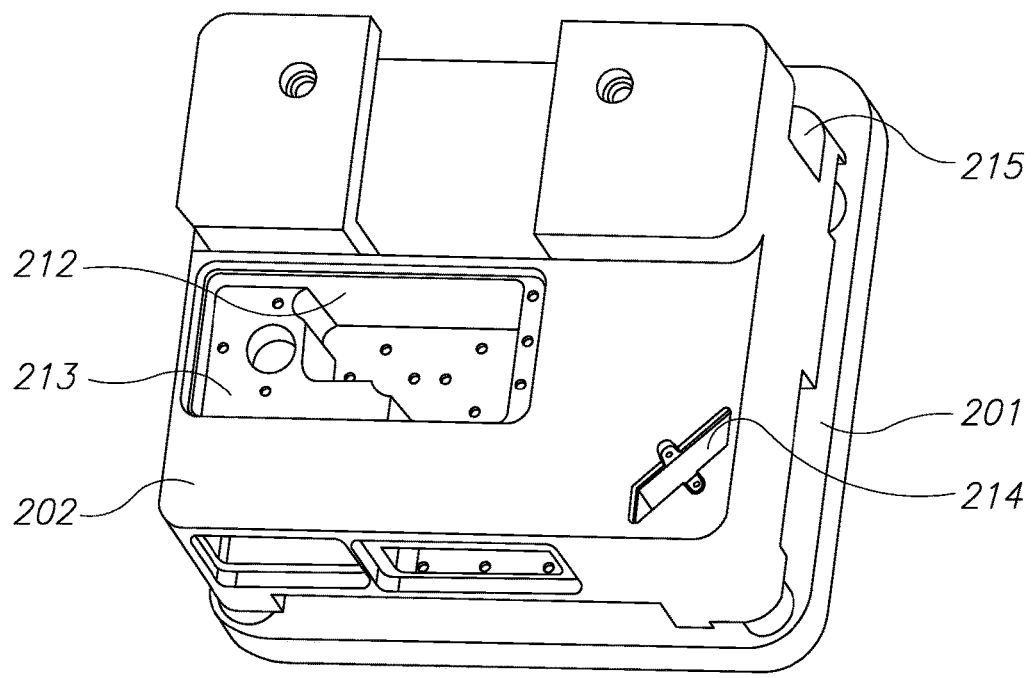
Figure 8D:
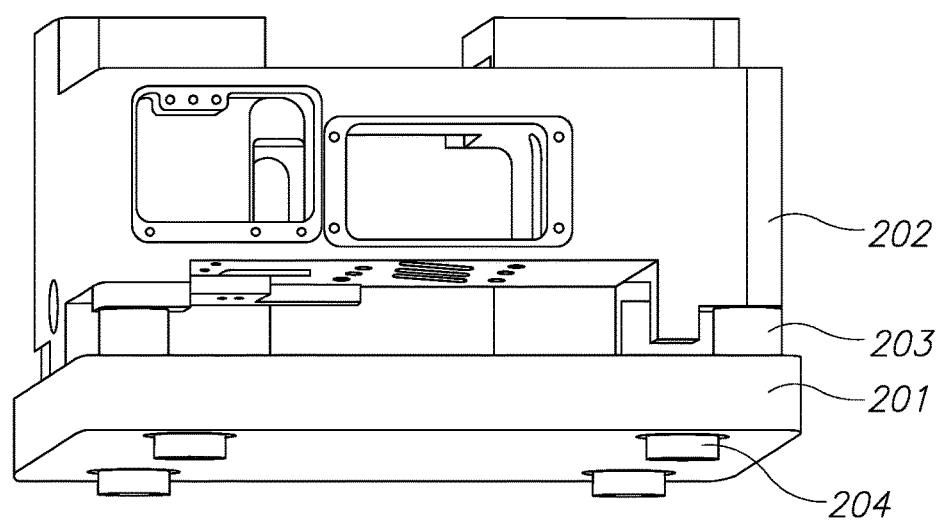

A second embodiment of a compact microscope will now be described with reference to FIGS. 7 to 11b. As shown in FIGS. 7a and 7b, a compact microscope shown at 200 comprises a substantially planar support element 201 which supports primary optical support element 202. The primary optical support element 202 is supported by the support element 201 through vibration isolating mounts 203. In addition, the support element 201 has vibration isolating feet 204 on its slow surface to engage the potentially unstable work surface on which the compact microscope 200 is placed, to further reduce transmitted vibrations.

As shown in FIGS. 7a and 7b, the compact microscope 200 further includes an enclosure 205 which is supported by the support element 201 but is physically distinct from, and not connected to, the primary optical support element 202. The enclosure 204 serves to isolate the optics of the microscope from environmental influences and external light, and to protect the user from harmful light intensities within the microscope. As in the first embodiment, the enclosure 204 may be provided with an interlocked access hatch to provide access to the sample stage if required.

The primary optical support element 202 will now be described in more detail with reference to FIGS. 8a to 8d. In these figures, the primary optical support element 202 is shown located on the support element 201, but with the enclosure 205 and the secondary optical support elements, described below, omitted. In contrast to the embodiment of the compact microscope shown in FIGS. 1 to 6, in this example the primary optical support element 202 is a complex shape designed to accommodate the optical components in a multi-planar configuration, permitting a more compact arrangement than a relatively simple planar primary optical support element. The primary optical support element 202 has two sections, a camera support section generally shown at 210, and an optical support section generally shown at 211. The optical support section 211 comprises a volume 212 to receive the optical components in a number of secondary optical support elements. An upper part 213 of the volume 212 is shaped to receive an objective stage, described in more detail below. The primary optical support element 202 further includes integral mirror mounts to receive mirrors to direct light from the microscope tube lens to the camera as discussed in more detail below. The primary optical support element 202 in this example comprises four machined components which are rigidly attached to one another, but any suitable means of fabrication and assembly may be used. It would be possibly to fabricate the primary optical support element as a single component, but using multiple elements enables modularity (for example to permit the use of a different camera, or manipulate the signal between the tube lens and the camera) and makes machining the components easier.

Figure 9A:
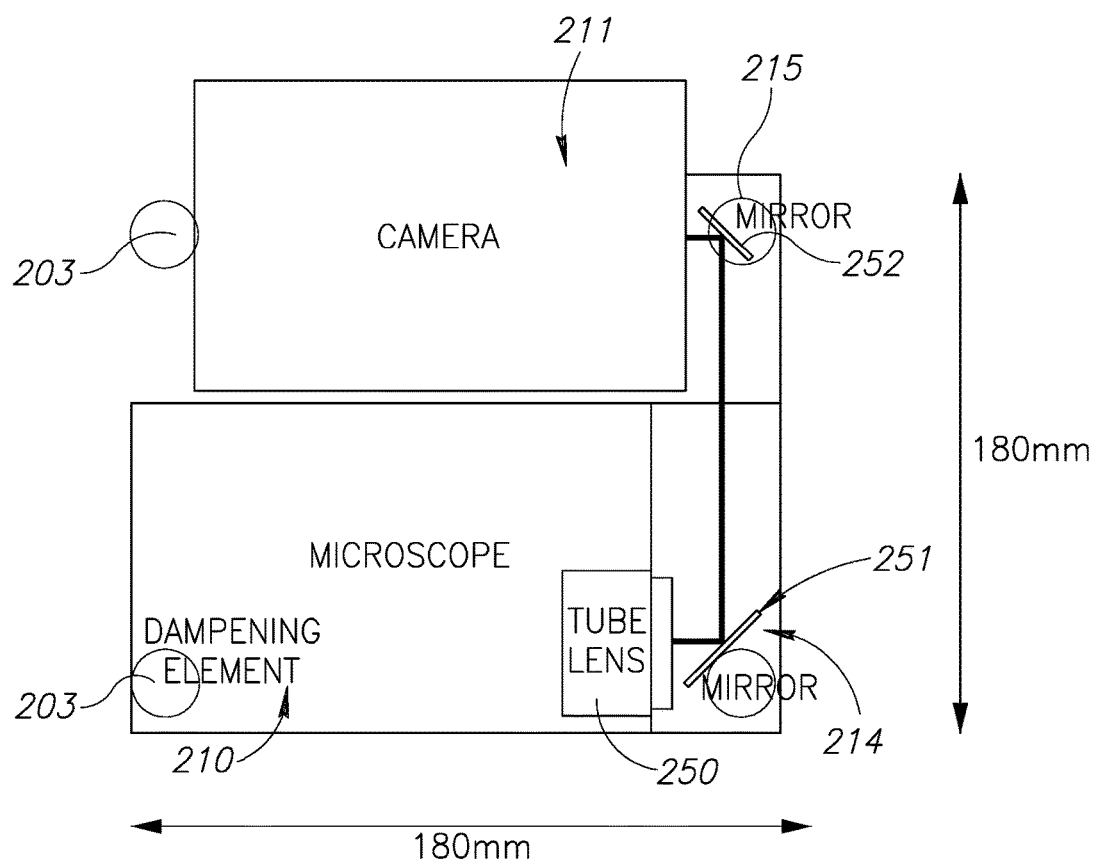
FIG. 9e is a perspective view of the optical configurations of FIGS. 9b to 9d.

The layout of the compact microscope 200 is shown diagrammatically to scale in FIGS. 9a to 9e. FIG. 9a is a top view showing the relative arrangement and dimensions of the optical arrangement and camera to scale. The locations of the vibration isolating mounts 203 are shown for reference, and in this example the total footprint is about 180 mm on each side. The microscope optics are laid out so that the dimensions of the optical arrangement are 146 mm×90 mm, achieved by stacking multiple layers of optics on top of or next to one another in close proximity.

Figure 9B:
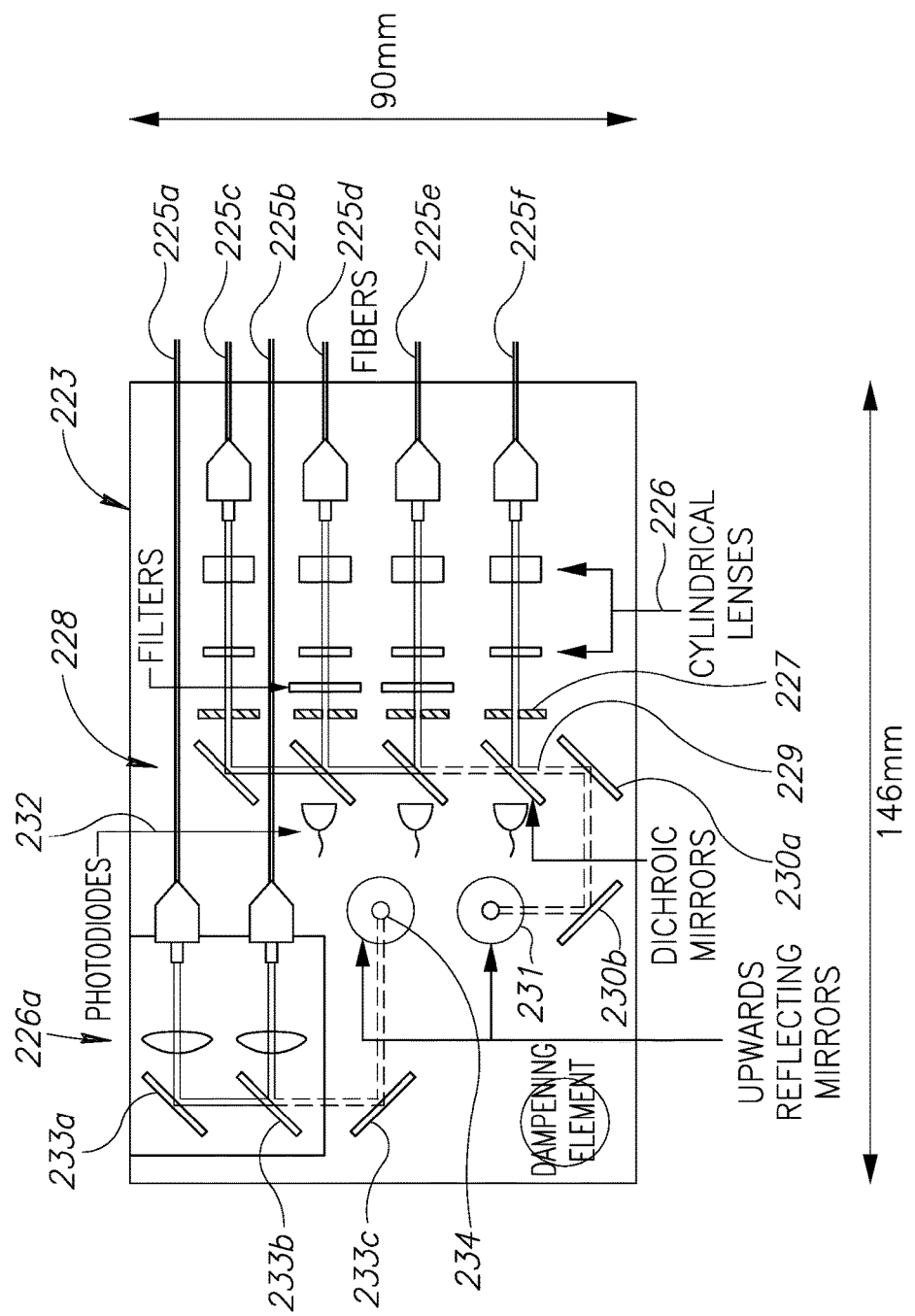

As seen in FIGS. 9a to 9e, the optics are arranged in three planes, a lower plane 220, an upper plane 221 and a vertical plane 222. Broadly, the illumination optical system is located in the lower plane 220 and the vertical plane 222, and the receiving optical system is located in upper plane 221. As seen in FIG. 9b, the lower plane 220 comprises a light receiving section 223, to receive light from a plurality of optical fibres from a suitable source, for example an illumination source module similar to that of FIG. 3a. The optical fibres are shown at 225a to 225f. The light received from fibres 225c to 225f passes through a respective pair of cylindrical lenses 226 and an aperture 227 similar to be aperture 27 of FIG. 2a. As in the example of FIG. 2a, to provide a beam having a desired profile, in this example a substantially rectangular beam shape, without requiring complex and optics and thus reducing the space required. A series of dichroic mirrors 228 reflects the beams along a common path, 229 such that the combined beams strike mirrors 230a, 230b and are directed towards first upwardly reflecting mirror 231 lying in plane 222 which reflects the combined beams upwards.

A plurality of photodiodes 232 are located to receive light which passes through the dichroic mirrors 228, to enable the respective power in each beam arriving at the microscope to be measured. Advantageously, no additional beam splitter is required to allow the determination of the power in each beam, maximising the available usable power and reducing the need for further components.

The light from fibres 225a, 225b is received separately from that fibres 225c to 225f. The received light is directed through focusing lenses 226a and directed by mirrors 233a, 233b, 233c to second upwardly reflecting mirror 234 in the vertical plane 222. Mirror 233b may be a dichroic mirror.

Figure 9C:
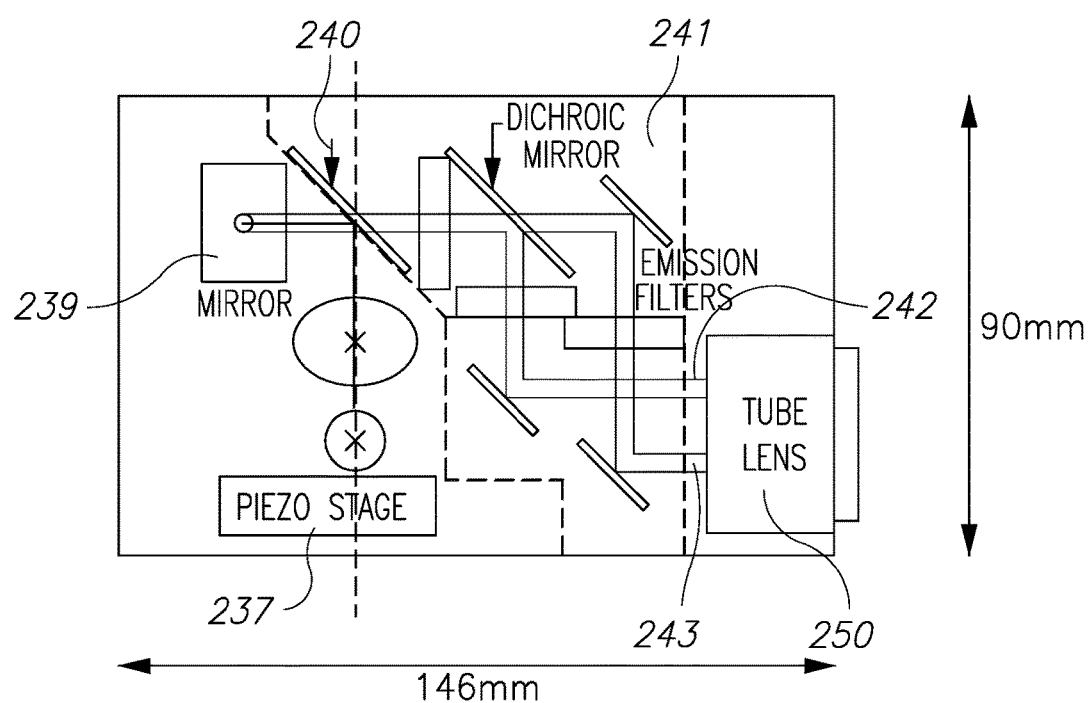
Figure 9D:
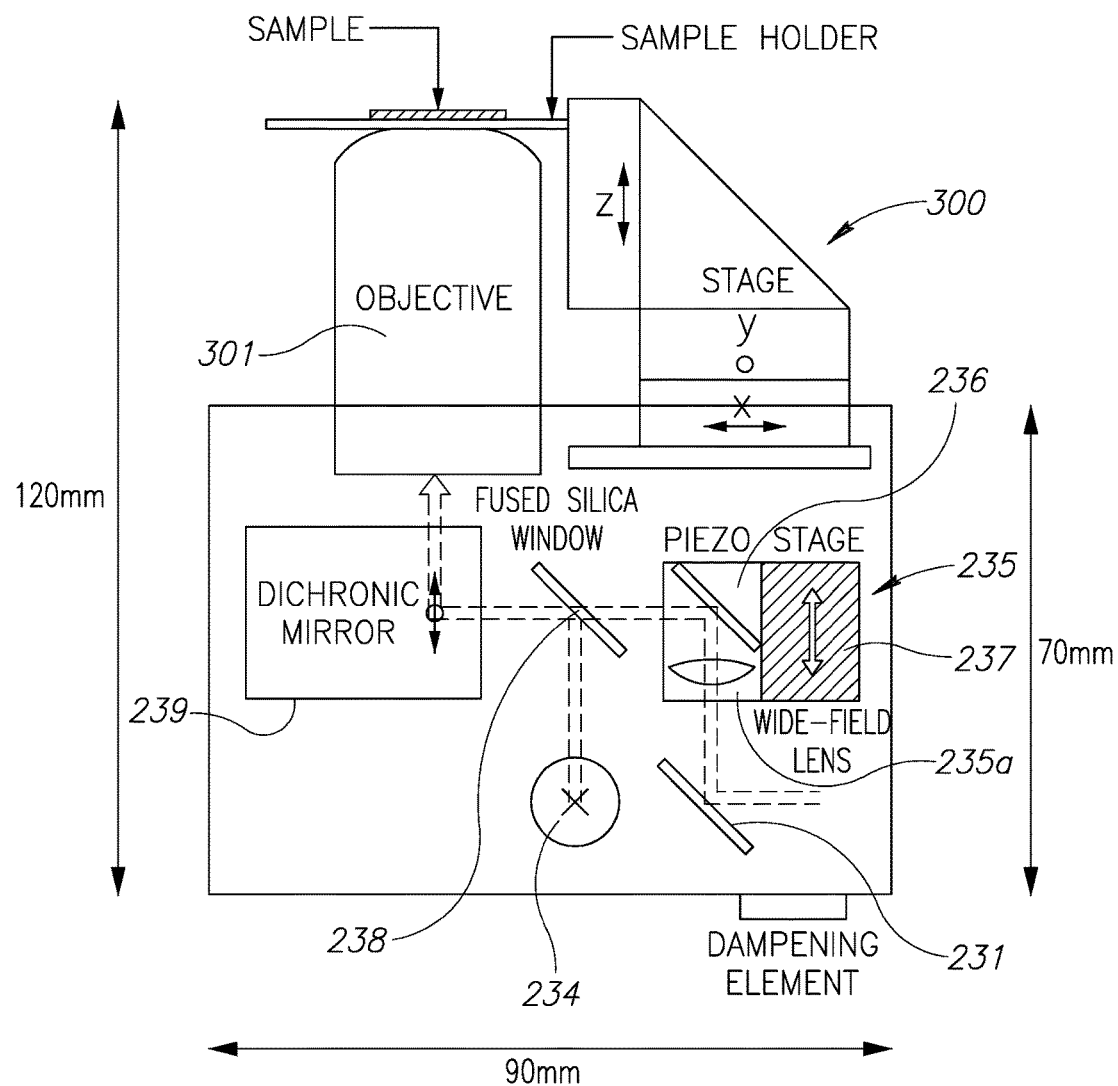
Figure 9E:
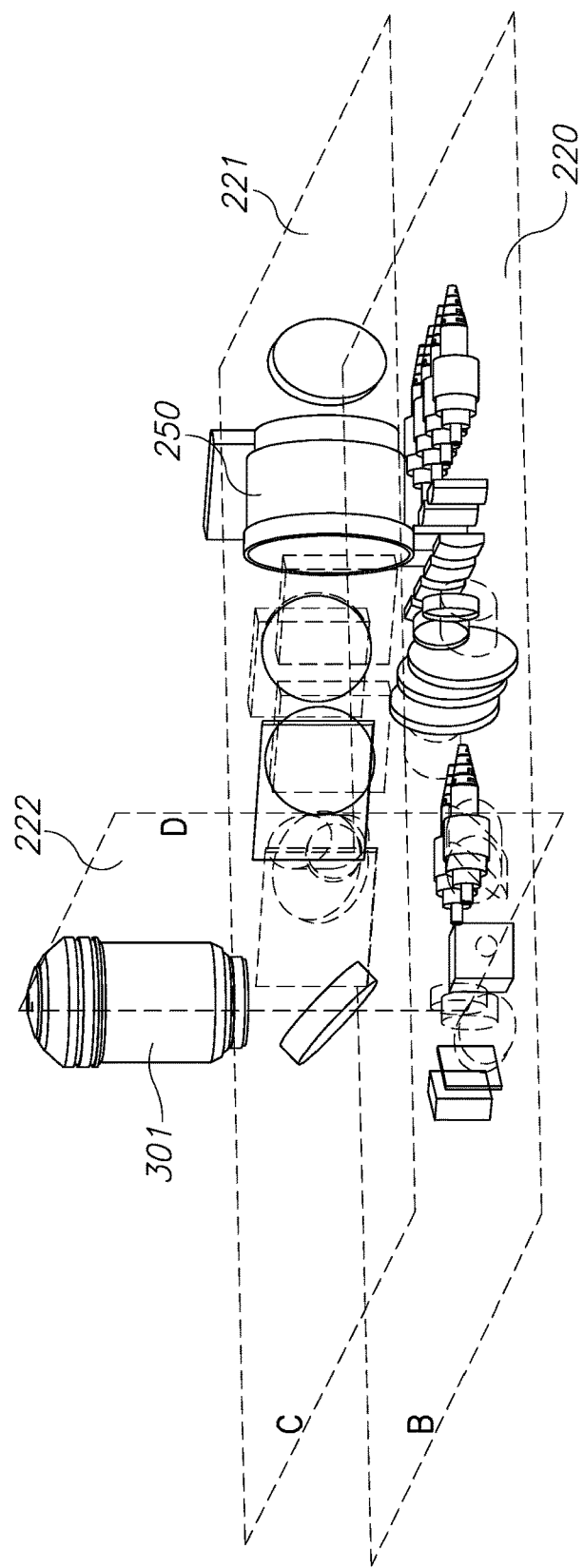

The optics in the vertical plane 222 are shown in FIGS. 9d and 9e. The light reflected from first upwardly reflecting mirror 231 is received by a wide field lens unit 235. The light is focused by the wide field lens 235a and is directed laterally by mirror 236 towards dichroic mirror 240 and then mirror 239 which reflects the converging beam into the objective, such that a focus is formed in the rear focal plane of the objective, and collimated light emerges out of the objective front focal plane. The wide field lens unit 235 includes a piezo actuator 237 which may be automatically or manually controlled to vary the position of lens 235a. The piezo actuator 237 translates the lens 235a and the mirror 236 so that the distance from the lens 235a to the objective remains constant. This is in particular required for a short focal length lens 235a, but a constant distance to the objective is not crucial for larger microscopes where a lens with much longer focal length is used. The piezo actuator allows the lens 235a to adjust the illumination for total internal reflection microscopy. Light from second upwardly reflecting mirror 234 strikes a fused silica window 238 and is simply directed to mirror 239 and into the objective stage 300. There are minimal losses for the light directed from the first upwardly reflecting mirror 231 because the fused silica window 238 is transparent in the relevant wavelength region and is anti-reflection coated. The use of fused silica minimizes fluorescence generated by the light transmitted through the window from mirror 231.

In this example, minimal transmission losses are needed for the converging light from upwardly reflecting mirror 231 which illuminates a large (for example 120 µm×60 µm) area in the sample plane, requiring more power, and high reflection losses are acceptable for the collimated light from upwardly reflecting mirror 234 which illuminates a small (for example 1 µm×1 µm) area, requiring less power. For other applications, other components such as dichroic mirrors may be used in place of the fused silica window.

The light returned from the sample and objective lens 301 is then directed by mirror 239 and dichroic mirror 240 to the receiving optical system generally shown in FIG. 9c. The receiving optical section includes modular elements in the area 241 which may be removed or adapted depending on the technique or function to be used with the microscope. In this example, module 241 comprises an optical arrangement similar to that of FIG. 3c, in which returned light from a sample in two wavelength ranges is separated into two spatially offset beams and directed to tube lens 250. The output beams are directed by mirror 251, held in integral mount 214 and mirror 252, held in integral mount 215, to the camera. The offset beams result in an output image shown as FIG. 6, with images 51 and 52 corresponding to different wavelengths or wavelength ranges offset two separate sections of the image frame.

Again, it will be apparent that the geometry of FIGS. 9b to 9e is extremely adaptable, in that only a subset of the input fibres 225a to 225f need be used as required, and the return optical module 241 may be replaced as required. The requirement is only that the beams entering and leaving the module 241 are focused to infinity to enable easy replacement.

Figure 10A:
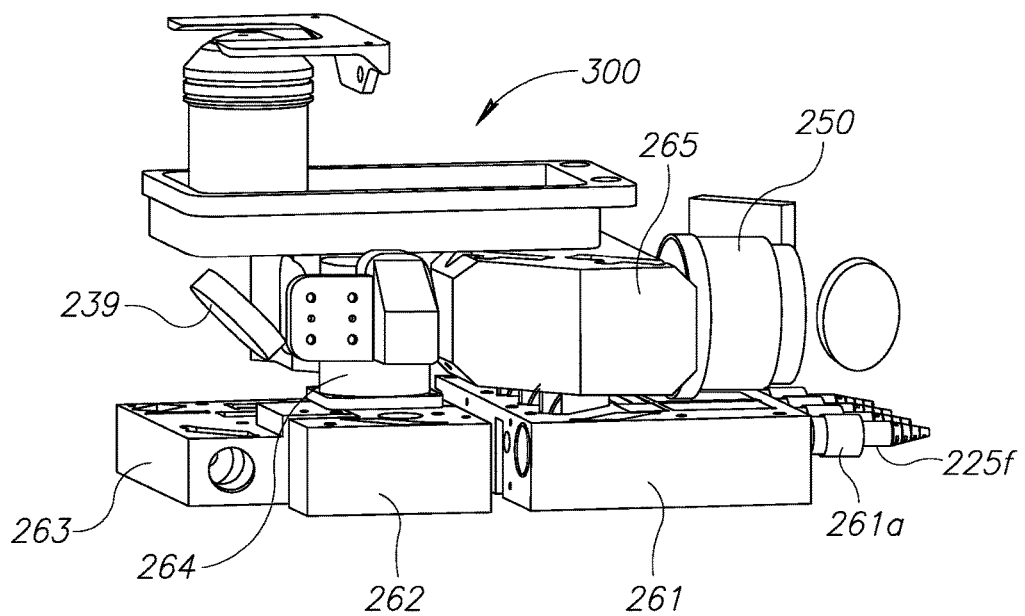
FIG. 10a is a perspective view of the secondary optical support elements of the compact microscope of FIGS. 7a and 7b.
Figure 10B:
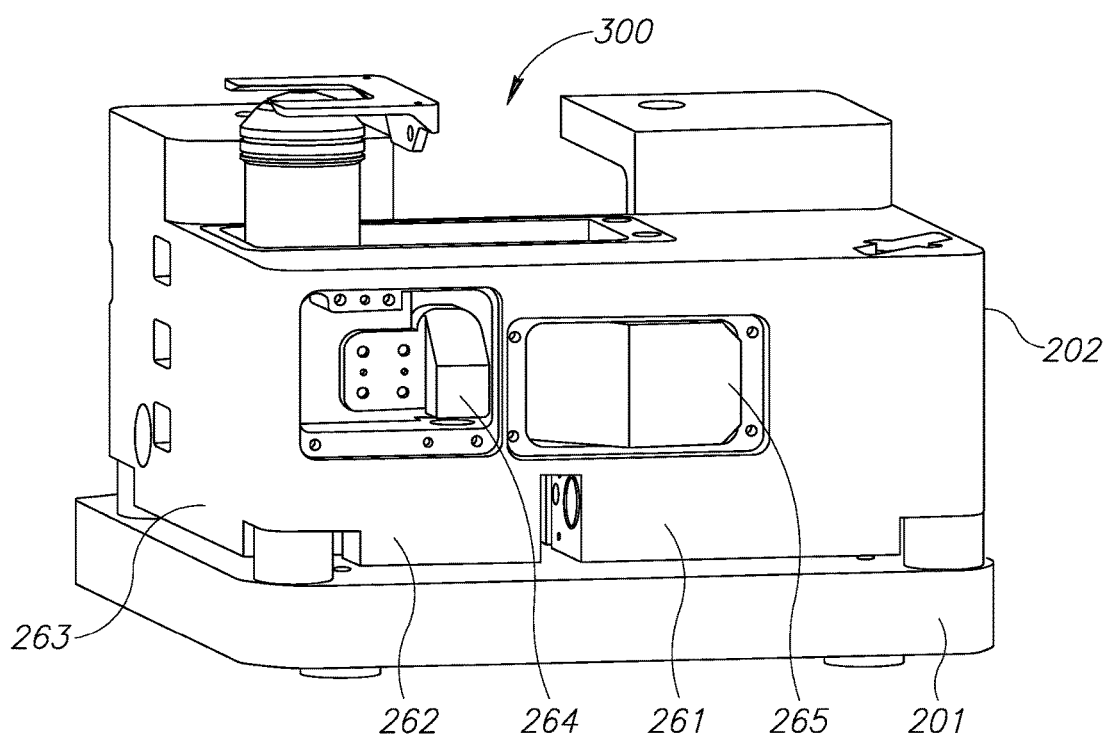
FIG. 10b is a perspective view of the secondary optical support elements of the compact microscope of FIGS. 7a and 7b mounted in the primary optical support element of FIGS. 8a to 8d.

The secondary optical support elements are illustrated in FIGS. 10a and 10b. First secondary optical support element 261 has connections 261a to receive fibres 225c to 225f and includes lenses 226, apertures 227 and mirrors 228 and 230a. Second secondary optical support element 262 supports first and second upwardly reflecting mirrors 231, 234.

Third secondary optical support element 263 similarly contains simply comprises connectors (not shown) to receive fibres 225a, 225b, lenses 232 and mirrors 233a, 233b, 233c. Fourth secondary optical support element 264 holds the wide field lens unit 235 including the wide field lens 235a, piezo actuator 237 and mirror 236. Silica window 238 is held in place by a separate secondary optical support element and mirror 239 is held directly by the primary optical support element 202. Fifth secondary optical support element 265 provides the receiving optical system 241 as a unit or a as a group of sub-modules. As illustrated in FIG. 10b, each of these components is received within volume 212 of the primary optical support element 202, substantially filling the volume 212 thus providing a rigid and accurately aligned configuration which is modular and adaptable as required. If necessary, parts of the volume 212 not otherwise occupied by secondary optical support modules may be occupied with solid or hollow filler blocks to provide additional rigidity. At the same time, since many apertures are required to allow the beams to propagate, the microscope is filled with holes, making it a naturally rigid, light-weight, hollow structure, which reduces deformation by self-weight. Advantageously the different planes are separated by an opaque part of the primary optical support element or a secondary optical support element.

Figure 12:
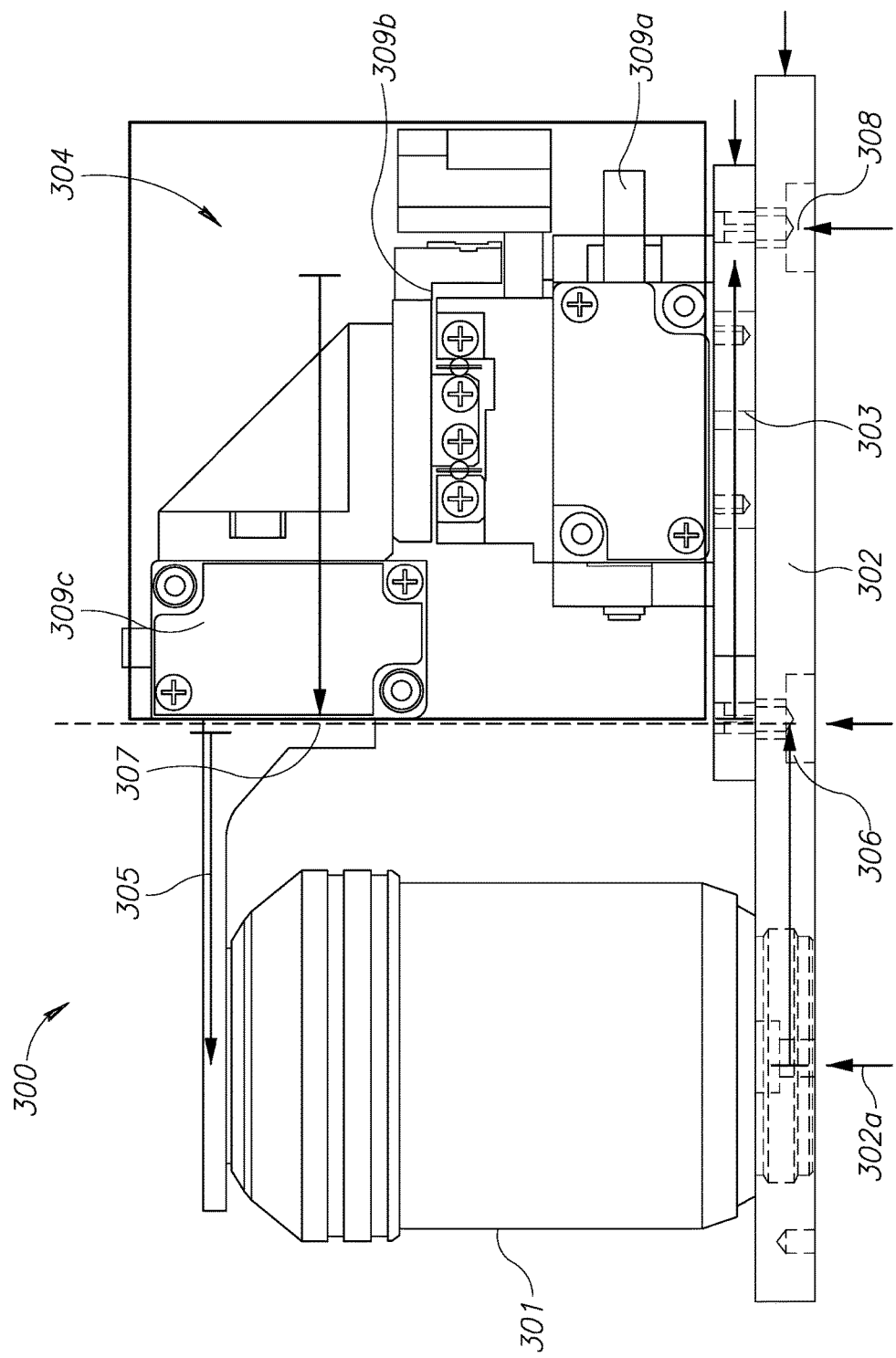
FIG. 12 is a side view of an objective stage for use with a compact microscope embodying the present invention.

An integral mirror mount 214 is shown in more detail in FIGS. 11a and 11b. As seen in FIG. 11a, integral mirror mount 214 comprises a vertically extending slot 270. A beam aperture is shown at 271, comprising a right-angled channel. The vertical slot 270 is shaped such that it has a depth greater than the depth of the beam aperture 271 to provide a lower support step 272. The mirror 251 is sized such that it engages the lower support step 272, extends across with the beam aperture 271 and engages an upper lip 274 of the slot 270 above the beam aperture 271. A spring 275 located between the mirror 251 and a back wall 276 of the slot 270 holds the mirror in place. The spring exerts a constant, temperature insensitive force perpendicular to a surface to which the optical element aligns to. A similar configuration is used for integral mount 215, with the exception that the slot 270 is shaped such the mirror 252 is introduced perpendicular to the alignment surface rather than in parallel, and is held in place by a suitable locking element that compresses the spring. Hence, each integral mirror mount 214, 215 has a surface against which a respective mirror is held, which is permanently defined by the machining process and cannot be altered, making misalignment impossible. In addition to defining the alignment surface, the machining process concurrently creates an access port such that the mirror and the spring can be inserted. Isolation against dust is also provided since the mirror makes physical contact with the alignment surface and seals the machined apertures in which the light propagates. Although only integral mirror mounts 214, 215 are shown in the figures, similar integral mirror mounts are used elsewhere in the primary and secondary optical support elements where appropriate Objective Stage The objective stage 300 is shown in more detail in FIG. 12. The objective stage 300 supports the microscope objective 301. The objective stage 300 comprises an Invar baseplate 302 on which is mounted a movement stage 304, primarily made of aluminium, for example. The movement stage 304 supports and moves an Invar sample holder 305 and allows the adjustment of the three-dimensional position of the sample holder 305 relative to the microscope objective 301. The stage 304 is connected to Invar baseplate 302 by a plate 303 of the same material as the stage. A first mounting point 306 connects the aluminium plate 303 and the Invar baseplate 302 such that mounting point 306 is aligned with the front face 307 of the stage 304. A second, rearward, mounting point 308 connecting the aluminium plate 303 and the Invar baseplate 302 allows for relative sliding movement between the aluminium plate 303 the Invar baseplate 302. The Invar plate is mounted on the primary optical support structure in recess 213 and fixed to the primary optical support structure 202 through a first fixed mounting point 302a which is aligned with the axis of the objective, and a second mounting point (not shown) that allows relative sliding movement between the aluminium primary optical support structure 202 and the Invar plate 302. The movement stage 304 has three piezo friction motors, generally shown at 309a, 309b and 309c respectively.

The objective 301 is thus held in a fixed position relative to the primary optical support structure 202 and the optical systems mounted therein. The configuration of the objective stage 300 allows for compensation of thermal expansion of the movement stage 304, expansion of the sample holder, and of the material connecting the objective and the movement stage 304.

The compensation for the thermal expansion of the movement stage 304 is achieved by locating the fixed mounting 306 of the aluminium plate 303 underneath the aluminium stage aligned with the face 307 of the movement stage 304, which is contact with the Invar sample holder 305. Therefore, if the aluminium movement stage 304 expands to the left, the aluminium plate 303 will expand to the right and the amount of expansion relative to the face 307 is equal and will therefore cancel. The compensation will not completely cancel the relative expansions when the stage 304 is moved from the centred position toward or away from the objective and the face 307 misaligns with fixed mounting point 306. However, this geometry will reduce drift to a minimum, and drift increases linearly from 0 when the stage 304 is at the default position to a small maximum at the extremes of the stage range (which will be used less likely than a position close to the centered position).

In this geometry, thermal expansion of the Invar section between the objective lens 301 and face 307 is equal in magnitude but opposite to the thermal expansion of the sample holder 305, so that relative movement between the objective 301 and a sample held on the sample holder 305 is cancelled. The fixed mounting 302a ensures that the objective 301 remains in place while the sliding mounting allows the Invar base plate to expand or contract relative to the primary optical support element 202.

Although the objective stage 300 here comprises Invar and aluminium components, it will be apparent that the stage may comprise components fabricated from other materials as desired. Two pairs of parts should have matched thermal expansion coefficient, the first pair being the sample holder and the objective mounting plate, and the second pair being the movement stage and the plate 303. The objective stage may be used with any other suitable microscope, not only the examples described herein, and may comprise one actuator or any number of actuators as needed for the desired degrees of freedom of movement of the sample holder.

Focus Control

A focus control system can maintain the axial position of the sample relative to the focus of the objective lens 301 by controlling the position of the sample holder 305.

To achieve this, a focus stability beam is provided from a focus stability beam fibre connection. In the first embodiment of the compact microscope, a microscope focus control system is illustrated in FIGS. 2, 3a and 4. A focus stability beam 60 is provided from a focus stability beam fibre connection 61, connected to in this case a single-mode optical fibre 61a to transmit light from a focus stability beam laser source 59 in the illumination source module 40. Focus stability beam 60 is collimated by lens 62 and directed to the objective lens system by mirror 63 and dichroic mirror 34. The mirrors 63, 34 direct the focus stability beam 60 into the objective lens system 18 at an angle relative to the optical axis 25. The focus stability beam fibre connection 61, lens 62, mirror 63 and dichroic mirror 34 are collectively referred to as the focus stability beam optical system.

In the second embodiment of the compact microscope, one of the fibres 225a, 225b may be used as the focus stability beam fibre connection. In this case, the focus stability beam is directed to the objective lens 301 by mirrors 233a, 233b, 233c and 234 as discussed above.

The wavelength of the focus stability beam can be chosen such that the sample is not affected by the light (e.g. off-resonance light if the sample contains fluorescent molecules). The focus stability beam is preferably only active when the sample is not being imaged. The objective lens system focuses the focus stability beam at the interface between cover glass and sample medium, where a part of the light is reflected. The beam enters the objective on the same path as the excitation lasers, but it is collimated so that an approximately focused spot is visible in the image plane (on the camera) when the glass/sample medium interface is at the front focal plane of the objective. The beam is strongly converging due to the high numerical aperture of the objective lens, so that any movement of the interface away from the focal plane causes the reflection image to widen significantly. Light scattered from the illuminated region will be returned by the return light optical system to the detection apparatus, where an image can be captured. The image of the reflection will have a size, shape and position that depend on the distance between objective and the interface. To control the focus, the system and method compare a reference image with a subsequent image.

A first way of operating the focus stability system is in a focus lock mode. After the sample has been initially correctly positioned, the focus stability beam can be transmitted to the objective lens system and a reference image saved. If the position of the sample shifts relative to the objective, in a subsequently captured image the illumination region will change appearance. Accordingly, after moving to another field of view, a subsequent image is captured. If this differs from the reference image, the z-axis positioner is iteratively operated. The z-axis position will be varied in accordance with a calculated difference between the reference and subsequent images, and a further subsequent image captured. Again, the difference is calculated and a further z-positioning step carried out. In this way, the system will converge on the original focus in a few steps. The difference between the images may be calculated in any suitable manner.

In a second way of operating the focus stability system, storing a reference image may include storing a stack of reference images each corresponding to a known different position vertical position. This may be used to move the sample to a desired z position or to determine the z position of the sample. When it is desired to move the sample to desired z position, the reference image corresponding to that z position can be retrieved and an iterative process similar to that described above carried out, taking subsequent images and moving the z-axis positioner in small steps until the subsequent images converge on the desired reference image. Alternatively, by capturing a subsequent image and determining which reference image is the best match for the subsequent image, the z position of the sample can be determined.

A reference image or stack of images may be stored when the device is manufactured or calibrated. Additional or replacement reference images may be captured at any suitable point during operation of the microscope, for example before starting an acquisition, if a new focal plane is required or if the reference image becomes incompatible with the correct focus due to changes in the sample, or the microscope system. A subsequent image may serve as a reference image for subsequent operation.

Figure 13:
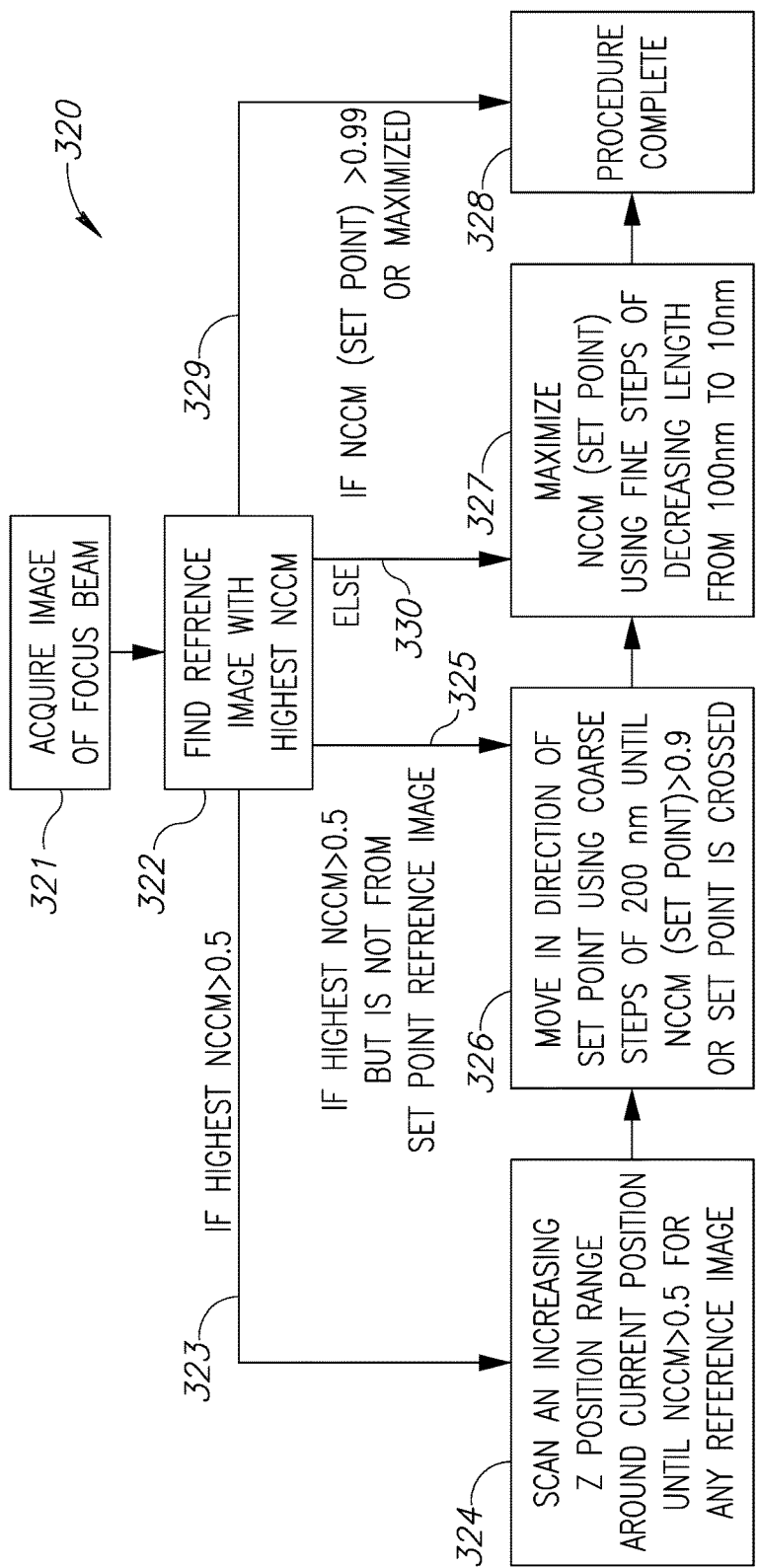
FIG. 13 is a diagram illustrating operation of a focus control system.

An example method is illustrated at 320 in FIG. 13. As shown at step 321, an image of the focus beam is acquired. At step 322 to the reference image with the highest normalised cross-correlation maximum (NCCM) is identified. The NCCM is a measure of how similar the captured and reference images are to each other, with complete similarity giving a score of 1 and no similarity giving a score of 0. Such an algorithm is sensitive to the shape of the reflection pattern, but not its intensity or its position on the camera.

Figure 14:
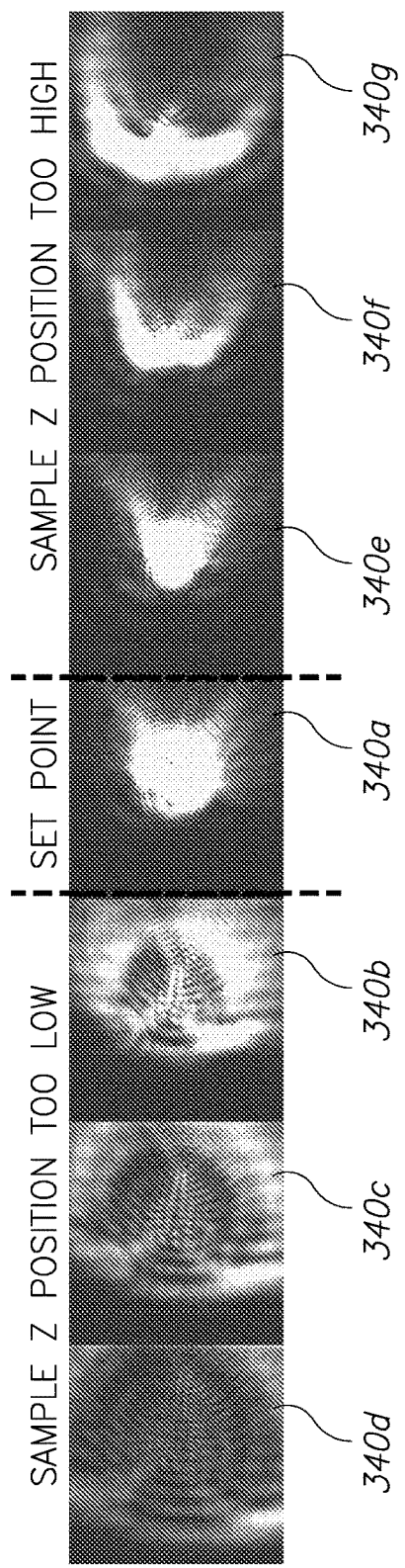
FIG. 14 shows a plurality of example reference images for use with the focus control system of FIG. 13.

As shown by arrow 323, if the highest NCCM is less than 0.5, then at step 324 the sample stage 305 is moved around the current z position at increasing ranges, and repeated images captured, until an image with a cross-correlation measure of >0.5 for any reference image is found. Once the step is complete, the method moves to step 326, which alternatively may be moved to directly from step 322 as shown by arrow 325 if the highest NCCM is >0.5 but is not from the set point a reference image. At step 326 the stage is moved in the direction of the set point using relatively large steps of 200 nm until the cross-correlation measure is >0.9 or the set point is crossed. At a fine tuning stage 327, after completing step 326 or directly after step 322 if the highest NCCM is between 0.5 and 0.99 and belongs to the set point reference image, the NCCM is maximised using steps of decreasing length 100 mm to 10 nm. When the NCCM is maximised, the procedure is complete as shown in 328. If the NCCM of the acquired and reference images is initially greater than 0.99, as shown by arrow 329, then the autofocus procedure is ended immediately. A set of example reference images is shown in FIG. 14, where the central FIG. 340a represents the set point. A series of FIGS. 340b to 340d represent images from progressively lower sample positions. Similarly, reference images 340e to 340g are images resulting from the sample position said being too high. Accordingly, as illustrated in FIG. 13, the focus apparatus will find the image that best matches the acquired image of the focus beam, and then adjust the z position towards the set point, i.e. the process will be iterated until the acquired image of the focus beam effectively corresponds to the reference set point image 340a. Where the acquired image of the focus beam at step 321 is not sufficiently similar to any of the captured images 340a to 340g, this indicates that the sample position is outside the range of the captured images, and the process successively moves the sample position until an image of the focus beam is acquired which is sufficiently similar to one of the stored reference images as shown at 323 and 324.

The microscope focus control system can thus maintain a stable sample position throughout extended operation of the microscope 10. The focusing takes less than 1 second and achieves nanometer accuracy. This auto-focus method does not require an additional photodetector for the reference beam, and lasers of very low beam quality, power and power stability can be used. The power of the focus stability beam in this example is extremely low due to inefficient single-mode fibre coupling without a focusing lens to the fibre 61*a* and as such presents a minimal hazard. The absence of a fibre coupling lens also removes the need for (re-)alignment of the laser with respect to the single-mode fibre.

In experiments where the sample is immobilized on the glass substrate, it is often possible and desirable to record independent data sets by moving the field of view to a new area which has not been exposed by the excitation lasers. Due to thickness variations of the cover glass on the order of a few microns and motion irregularities of the sample stage, a refocussing step is usually necessary before the acquisition of a new field of view. The focus control system allows this movement and refocussing step to be carried out automatically. For example, the sample could be moved in a spiral pattern to record multiple field of views. Before each field of view is exposed by the excitation lasers, the focus control brings the sample to a pre-defined axial position. As the light for the focus stability beam is emitted from the end of a fibre attached securely on the principle optical support element of the microscope, and the collimating lens and beam steering mirrors for the focus stability beam lack any degrees of freedom for adjustment, the angular stability of the beam is improved. Instead of using a dedicated sensor, the use of the main camera to detect the image of the focus stability beam again reduces the number of required components.

As a further method of controlling the focus and allowing the movement to a user desired plane, the glass/sample medium interface is set as the set point and the user is not permitted to change it. The focus control mechanism then moves the interface to the focal plane, and the position sensor of the piezo stage (which has ~1 nm precision) is then used to navigate away from the interface to a desired position. In other words, the interface is used as a starting point for movement relative to it, which could eliminate the need for recording reference images by the user and establishes the interface as the origin plane of a well-defined coordinate system.

Alternative Optical Configurations

Examples of how the microscope may be adapted to other applications are illustrated in FIGS. 15 to 19*b*. Advantageously, the compact microscope 200 is adaptable to any of each of these configurations by providing an appropriate fifth secondary support module 265.

Figure 15A:
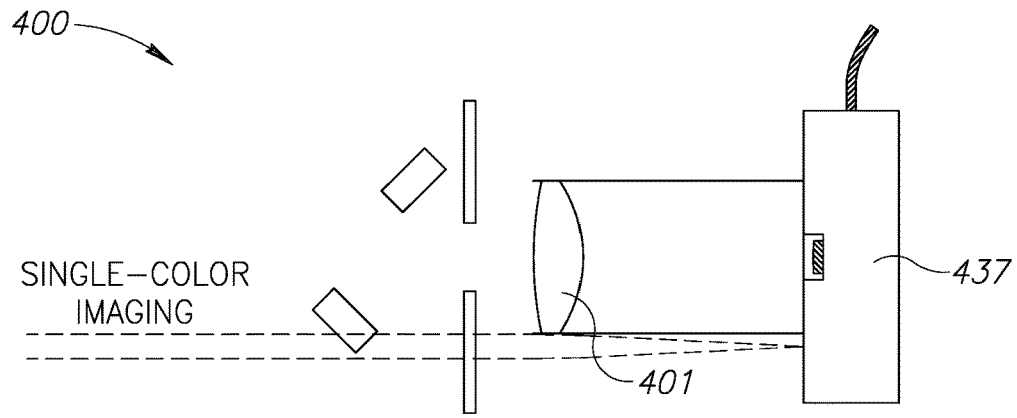
FIG. 15 shows examples of detection paths for one- to three-colour wide-field fluorescence microscopy.
Figure 15B:
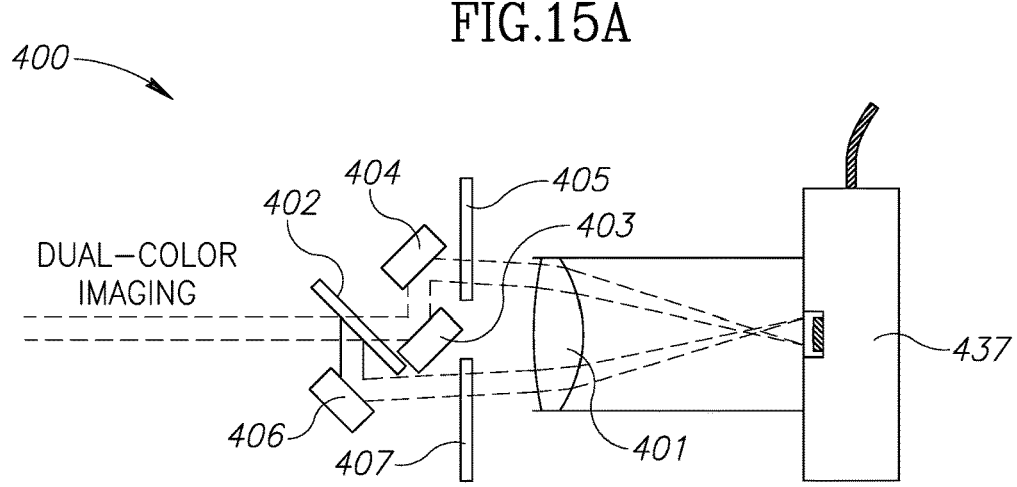
Figure 15C:
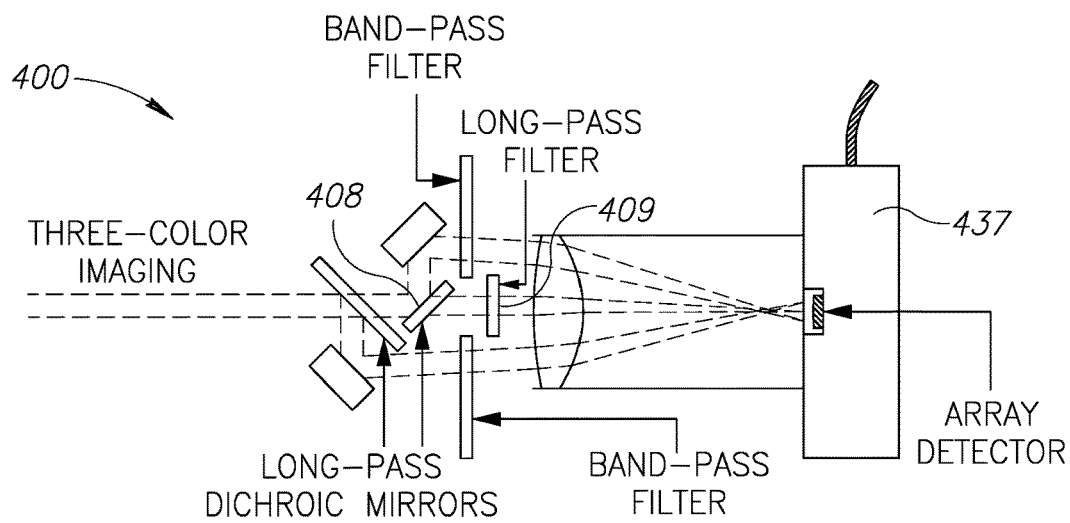

FIGS. 15*a* to 15*c* show a configuration of the return optical system adaptable to single-, dual- or three-colour wide-field fluorescence microscopy. The general apparatus is shown at 400 in FIG. 15*a*, in which the beam is focused by lens 401 directly on camera 437. In FIG. 15*b*, which is equivalent to the optical paths of FIGS. 3*b* and 3*c*, dichroic mirror 402 separates the returned light into first and second wavelength bands. Light in a first wavelength band passes through dichroic mirror 402 and is reflected by mirrors 403 and 404 through a first band-pass filter 405. Light in the second wavelength range is reflected by dichroic mirror 402 and mirror 406 and passes through band pass filter 407. The two resulting beams are spatially offset and are focused on different areas of the camera 437. In a further variation, shown in FIG. 15*c*, mirror 403 is replaced with a further dichroic mirror 408. Light in a third wavelength range passes through dichroic mirrors 402, 408 and long pass filter 409, and the three resulting beams are focused on separate offset areas of the camera 437.

Figure 16:
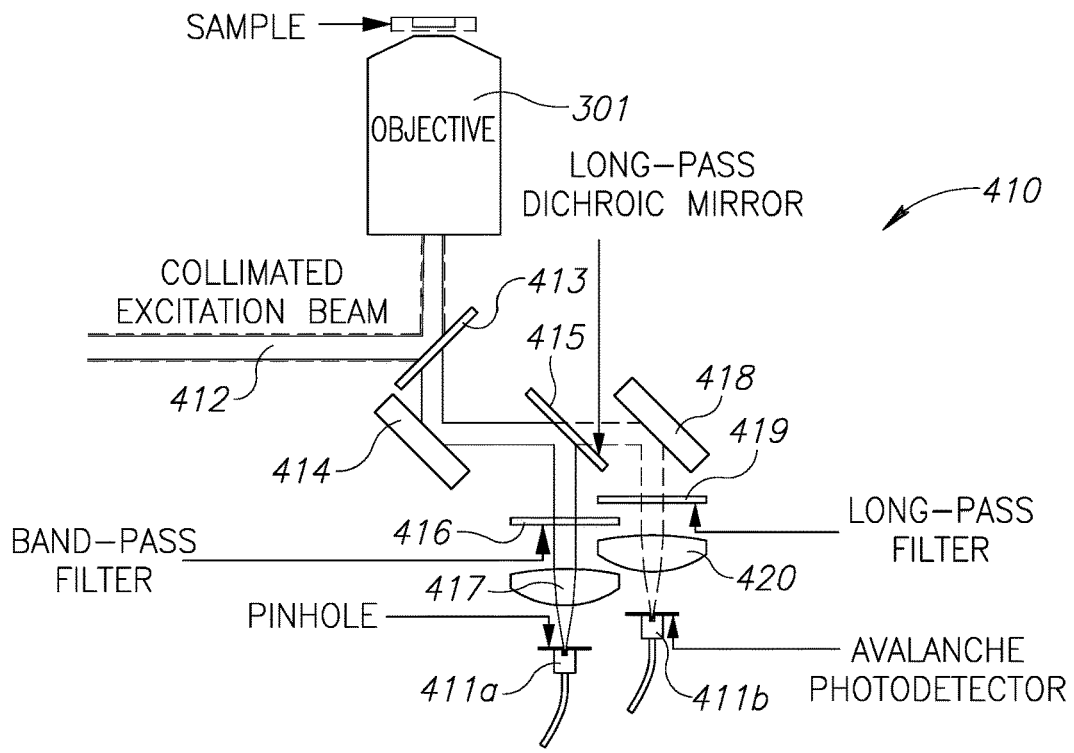
FIG. 16 is an example of optical paths for dual-colour confocal fluorescence microscopy.

FIG. 16 illustrates use of the microscope for dual-colour fluorescence confocal microscopy, and an example optical path is shown at 410. The detection apparatus in this application comprises a pair of photodetectors 411*a*, 411*b*, and particularly avalanche photodiodes providing high detection sensitivity. The excitation beam 412 comprises light in two wavelength bands as discussed above, and is collimated. The objective lens system focuses the illumination light on the sample 21. Returned fluorescent light passes through dichroic mirror 413 and is directed to the detection apparatus by mirror 414. Light in a first wavelength band is reflected by long-pass dichroic mirror 415, passes through band-pass filter 416 and is focused by lens 417 on the first photodetector 411*a*. Light in a second wavelength band passes through dichroic mirror 415 and is reflected by mirror 418, passes through long pass filter 419 and is focused by lens 420 on second photodetector 411*b*.

Figure 17:
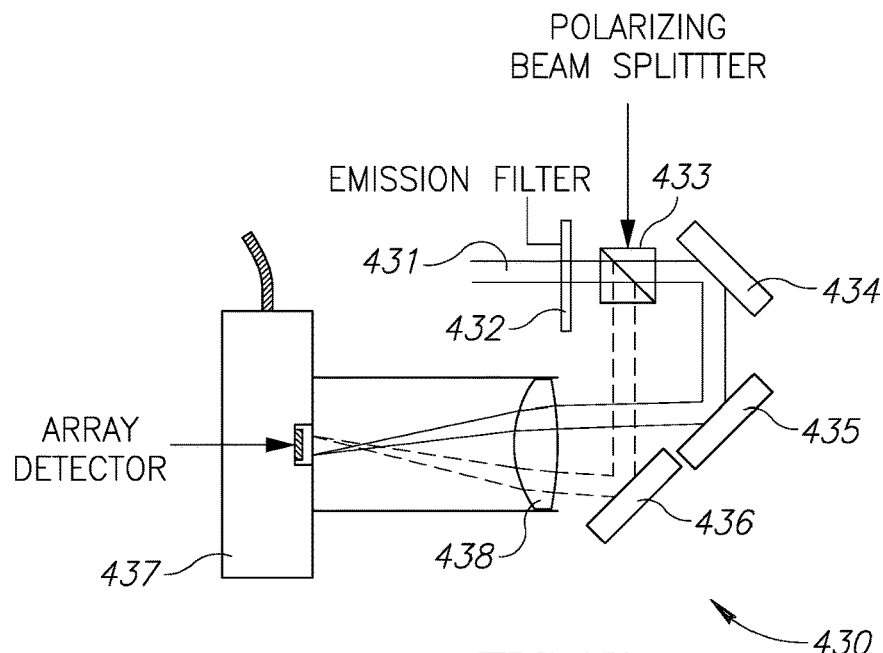
FIG. 17 is an example of an optical path for fluorescence polarization microscopy.

FIG. 17 shows a return optical path for fluorescence polarization microscopy at 430. The returned fluorescent light 431 passes through emission filter 432, and the returned light is separated into different polarization components by polarizing beam splitter 433. Mirrors 434, 435, 436 direct the differently polarized beams through lens 438, and the different beam are focused on offset regions of the imaging apparatus 437'.

Figure 18:
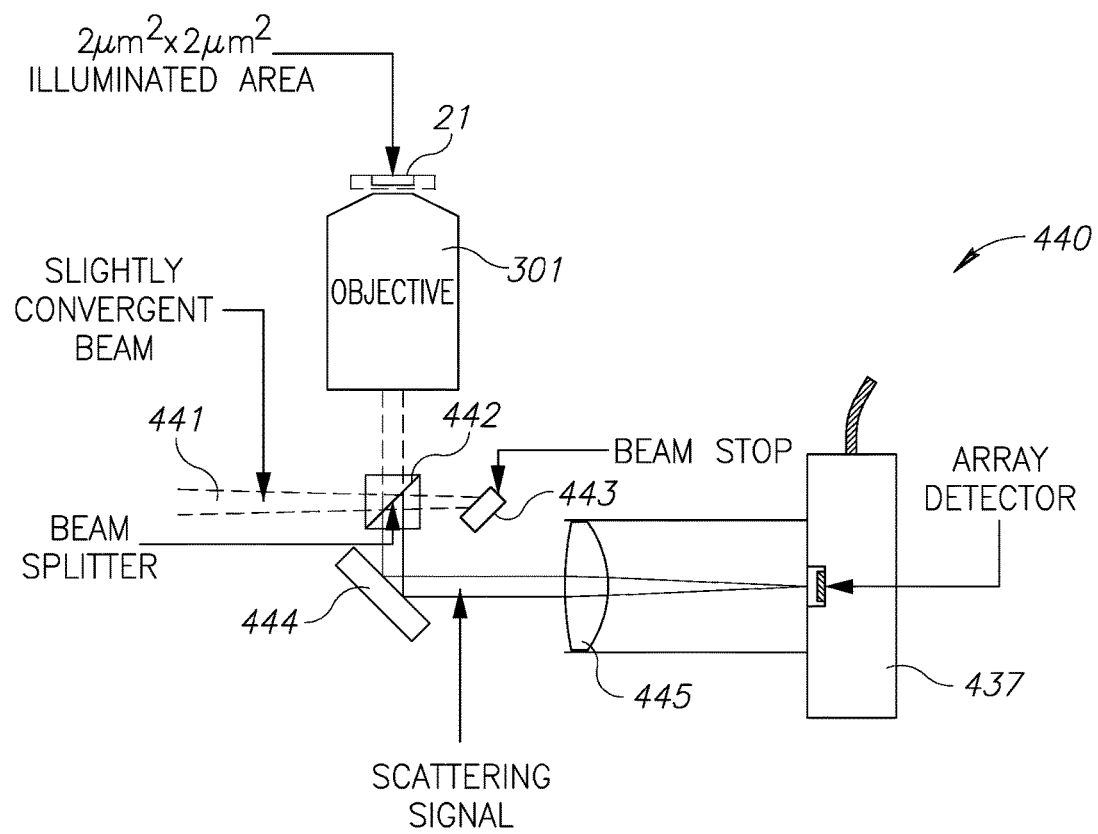
FIG. 18 is an example of an optical path for bright-field interferometric scattering microscopy.

FIG. 18 shows a configuration for bright field interferometric scattering (iSCAT) microscopy at 440. Illumination beam 441 is slightly convergent. The illumination beam 441 passes through beam splitter 442, which directs some of the illumination beam to objective lens system 18, illuminating an area of the sample 21. Beam stop 443 absorbs that part of illumination beam 441 which passes directly through the beam splitter 442. Illumination light scattered from the sample 21 interferes with illumination light reflected from an interface of the sample slide. The reflected light returns through beam splitter 442 and is reflected by mirror 444 and focused by lens 445 on imaging apparatus 437.

Figure 19A:
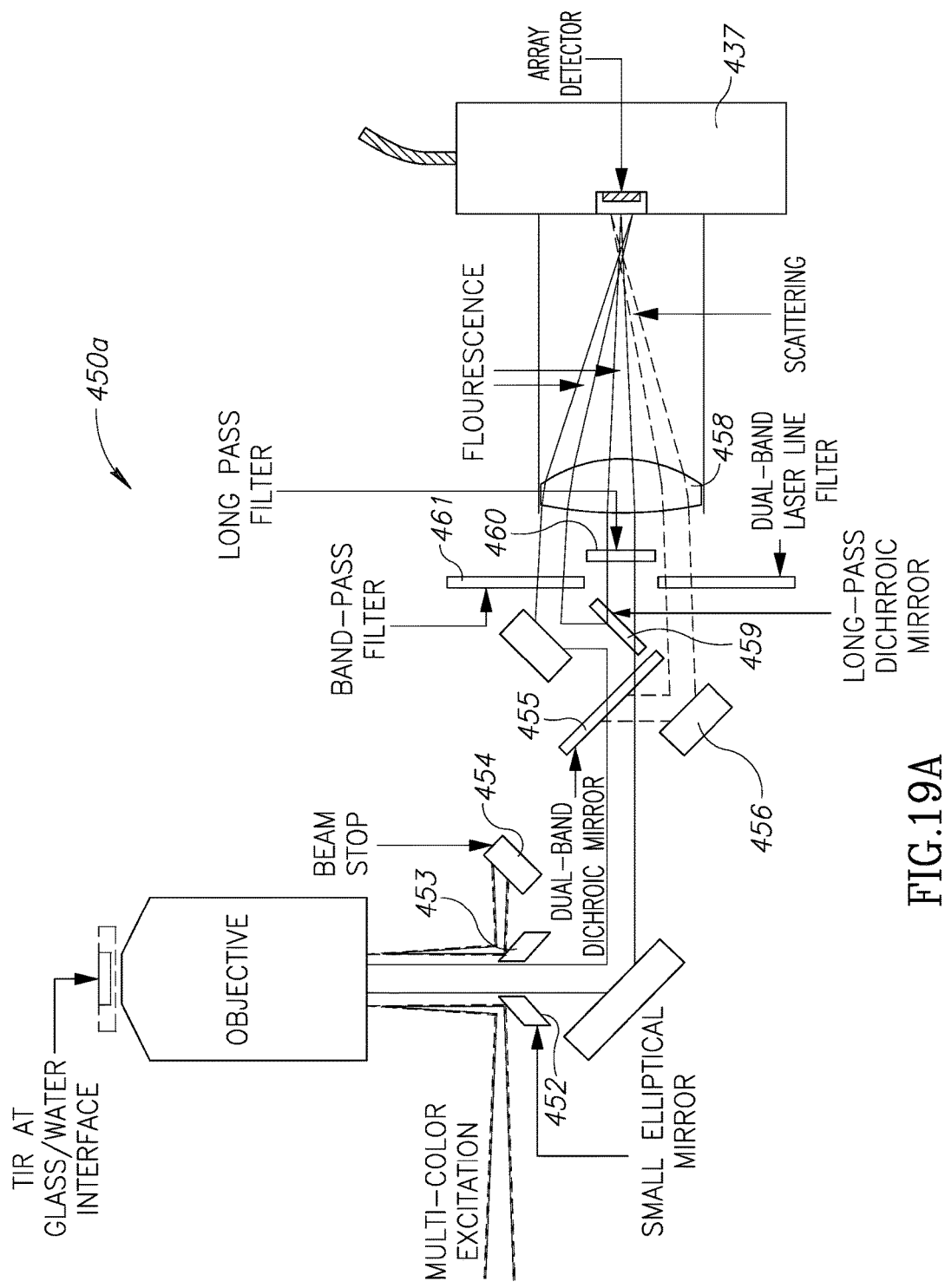
FIGS. 19a and 19b are example of optical paths for simultaneous dual-colour wide-field fluorescence microscopy and dark-field microscopy.
Figure 19B:
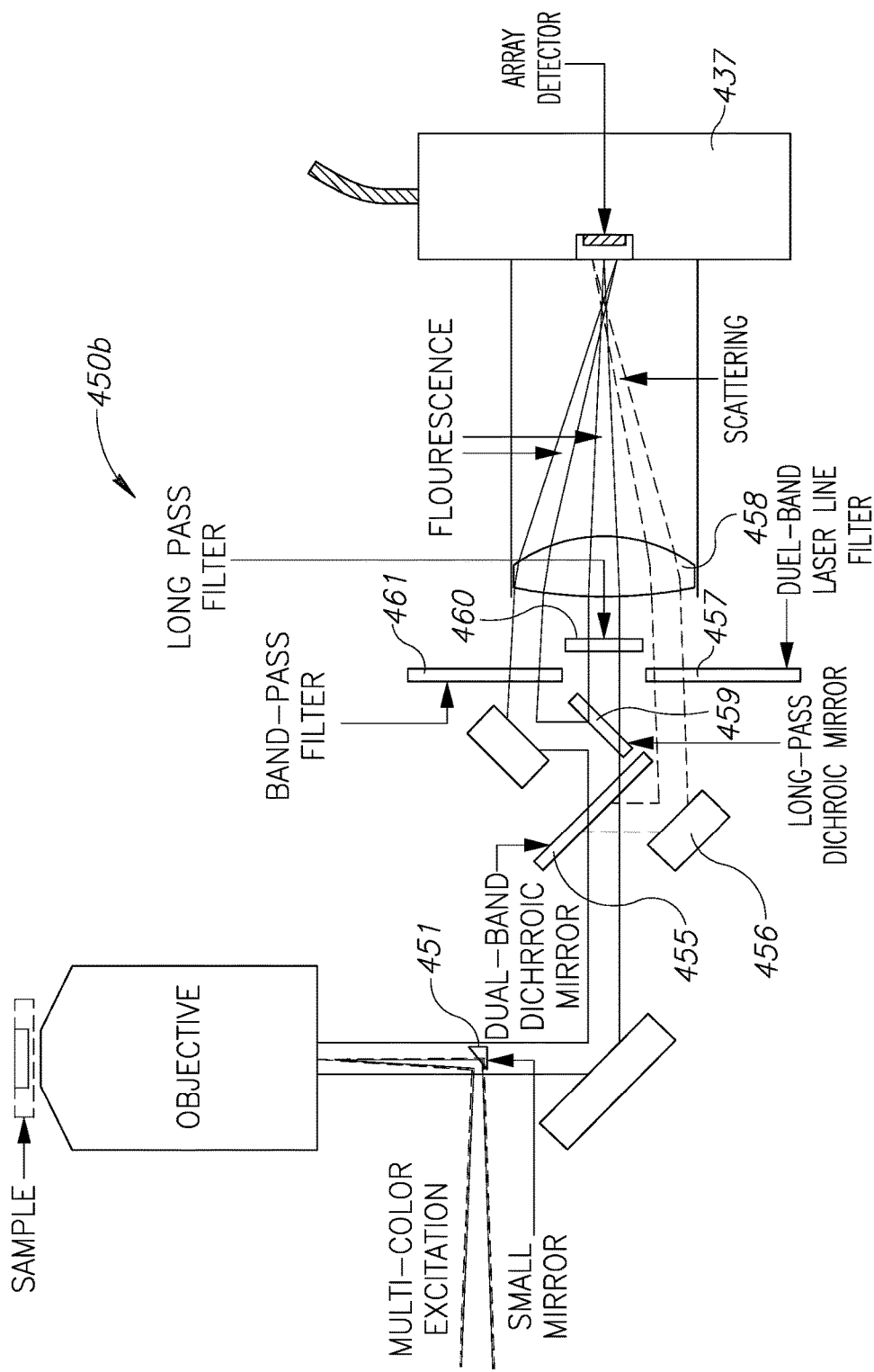

FIGS. 19*a* and 19*b* show optical paths for simultaneous dark field microscopy and multi-colour wide-field microscopy, shown at 450*a*, 450*b* respectively. In 450*b*, a small elliptical mirror 451 reflects the converging illumination light to the rear focal plane of the objective on the optical axis of the objective, so that the reflected illumination light returns on the optical axis and is reflected again by mirror 451 out of the detection path. In 450*a*, a small mirror 452 reflects the converging illumination light to the rear focal plane of the objective on the edge of its back aperture. The illumination light is total internally reflected (TIR) at the glass/sample interface and returns at the diametrically opposite edge of the back aperture, where it is directed by another small mirror 453 into an absorbing element 454. The latter geometry requires an oil-immersion objective with sufficiently high numerical aperture.

In each alternative, a system of dichroic mirrors and filters separate the fluorescent light and scattered light from the returned light and direct the various wavelength bands to different areas of the imaging apparatus 437. Dual-band dichroic mirror 455 is selected so that fluorescent light in first and second wavelength bands passes through the dichroic mirror 455, while scattered light is reflected. The scattered light is reflected by mirror 456, through dual laser-line pass filter 457 and lens 458 and is focused on a first area of imaging apparatus 437. Long pass dichroic mirror 459 separates the fluorescent light into first and second wavelength bands, which pass through long pass filter 460 and band pass filter 461 respectively and are focused on second and third areas of the imaging apparatus 437.

It will be apparent that the microscope focus control system will be suitable for use for any other type of microscope, not only the embodiments of compact microscopes described above. If appropriate, the focus control system may have its own imaging apparatus separate from the main detector of the microscope.

Adaptability

The compact microscope as described herein is advantageous in that it provides the most desirable aspects of wide-field imaging: low sample drift, high vibration stability, single-molecule detection sensitivity, automation and high-throughput in a form factor that is compact, robust, portable and low-cost.

The optical path was designed to provide the highest detection efficiency as possible, and to be as compact as possible. For multi-channel imaging on a single array sensor, the design does not require the formation of an image in the plane of a slit aperture which cuts the image. This is usually done to fit the image into rectangular regions on the array sensor. In contrast, the compact microscopes described above use a shaped incident beam which illuminates only the area that is going to be detected. Astigmatic lenses and a suitable aperture can be used to define the width and length of the incident beam. Compared to other channel splitting optical systems, the present system removes the need for two lenses and an adjustable slit aperture from the detection path, increasing detection efficiency and saving both space and component cost.

The provision of a separate illumination source module is advantageous in that it removes components from the microscope enclosure to permit the enclosure to be smaller, and prevents heat from the laser or supporting equipment heating the microscope enclosure and temperature-sensitive samples within the enclosure. The separate illumination source module also provides adaptability, in that to change the microscope function a different illumination source module can be easily provided and connected via an optical fibre link. Multiple connections to allow connection of the microscope to multiple illumination sections may be provided, or indeed multiple microscopes may be connected to a single illumination source module for parallel operation or reduced cost. Provision of laser sources may be continuous-wave or any combination of pulsed sources, including dual-laser excitation, triple-laser excitation, or complex pulse sequences, such as sequences with alternating single- and dual-laser excitation. Where optical fibres are used, the fibres may be manipulated in known manner, for example by heating or mechanical flexing, stretching or squeezing to produce homogeneous illumination light. The control electronics may also be provided as part of the illumination source module including for example a power supply, piezo drivers, laser drivers, signalling and I/O hardware, and fibre-squeezing piezo drivers. This means that, for example, to adapt the microscope for a particular experiment, it is only necessary that the appropriate illumination source module and secondary optical support modules (where needed) are connected to the compact microscope.

Alternatively, or in addition, an illumination source module or source may be provided within the microscope enclosure if desired. Any suitable detector, or group of detectors, and corresponding return optical system, may be provided to adapt the microscope to a desired function. Although a single objective lens system is described above, the microscope may include two or more objective lens systems if required. Although the microscope described herein has an objective lens system, for some applications this may be replaced by other light collection elements, such as a reflective objective system. The modular nature of the microscope optics and objective stage allow such adaptations.

Advantageously, the microscope may be provided with sensors to detect and record measurement parameters, such as temperature, humidity, pressure, atmosphere composition, acceleration, magnetic and electric fields and location. The information from the sensors can be used in a feedback system with control systems internal or external to the microscope enclosure, to realize the exact measurement conditions desired. For example, a temperature control unit mounted on the primary optical support element could heat or cool the entire microscope (and the air within the enclosure) to a certain temperature. With appropriate temperature control, the microscope could act as an incubator, particularly where samples must be kept at a certain temperature. Known approaches with normal microscopes only use an objective heater to keep the sample at the required temperature. This inevitably causes temperature gradients in the microscope as well as the sample which lead to drift of the microscope and convection in the sample. These problems may be reduced or eliminated by maintaining the entire environment at the required temperature. The internal atmosphere may also be regulated. For example, connecting a $CO_2$ line to the microscope and a gas regulator with feedback from the environmental sensors would make the microscope act as a mammalian cell incubator. The microscope software can also use sensor information to judge the quality of the measurement, and if necessary discard invalid measurements. Recorded sensor information will also support the reproducibility of measurements.

The microscope is very adaptable and flexible in terms of illumination and detection options, specimens examined, and concentration regimes. For example, a variety of illumination sections can be used: a single-wavelength continuous laser, a pulsed excitation source with modulation in the picosecond-to second time domain, complex excitation schemes with multiple modulated lasers modulated using different ways of modulation (e.g. electronic on/off modulation, choppers, acousto-optical modulators, acousto-optical tunable filters, electro-optical modulation). In some cases, a microscope can operate even in the absence of the illumination section, e.g., in the case of chemiluminescent compounds (where the state responsible for fluorescence emission is generated by a chemical reaction). The microscope can be adapted to accommodate samples that have many forms, e.g., a solution containing luminescent compounds, a coverslip with immobilized molecules, a flow-cell containing fluorescent molecules, a slide with fixed mammalian cells or tissue samples. Although the microscope has the sensitivity to detect single molecules, it can also operate in a high-concentration mode that looks at the average intensity in a single or multiple spectral emission channels. In terms of detection, formats for point source detection e.g. confocal microscopy (where a diffraction-limited volume illuminated by a focused laser beam is focused on a point detector such as an avalanche photodiode detector, APD) or wide-field imaging (where a large area in the specimen plane is imaged on a 2D detector such a CCD, EMCCD and sCMOS camera) can be achieved. In addition to fluorescence and also fluorescence lifetime imaging capabilities, careful selection of filters in the emission path and an appropriate geometry can enable scattering measurements. The laser light wavelength or wavelength may be selected to induce changes in the sample, for example to trigger photochemical or (photo)physical processes in the sample such as photoactivation of fluorophores (by a UV laser) or stimulated emission and control of the chemical and quantum state of fluorophores in general, and local changes in temperature (by a focused IR laser. The use of multiple sources allows light of several wavelengths to be directed to a sample as needed, or to different areas of the same sample.

The microscope system is very suitable for automation with suitable control and analysis software, where the hardware control, data acquisition and storage and visualisation processes are closely integrated. Suitable software can provide automated data acquisition, real-time analysis, intelligent data analysis, so little or no user interaction is required and real-time data visualization and reporting. In a wide range of applications, many signals can be measured simultaneously in a single field of view. With the piezo friction drives, the sample can be translated by several centimeters, so that thousands of fields of view can be measured in a fully automated fashion, with data analysis and interpretation occurring in parallel. An extremely large data set can be collected and processed in a very short time. One such microscope or an array of such microscopes could therefore be used for high throughput, massively parallel multidimensional screening applications, such as for use in a pharmaceutical environment.

The work leading to this invention has received funding from the European Research Council under the European Union's Seventh Framework Programme (FP7/2007-2013)/ ERC grant agreement no 261227.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belongs, unless otherwise defined.

The invention claimed is:

1. A compact microscope, comprising;
an enclosure,
a support element,
a primary optical support element located within the enclosure and supported by the support element,
at least one vibration isolating mount between the support element and the primary optical support element,
a moveable sample stage and an objective lens system mounted on the primary optical support element,
a sample holder mounted on a face of the moveable sample stage, and
a return optical system to receive returned light from the sample stage and transmit returned light to a detection apparatus,
wherein the return optical system is mounted on the primary optical support element, wherein the enclosure completely encloses the optical paths of the microscope, and wherein the enclosure and/or the support element comprise vibration isolating material, and
wherein the moveable sample stage is connected to the primary optical support element by a fixed mounting point at the face of the moveable sample stage on which the sample holder is mounted and by a slidable mounting point remote from the face of the moveable sample stage.

2. A compact microscope according to claim 1, having an illumination section and an illumination optical system to direct an illumination light beam from the illumination section to the moveable sample stage wherein the illumination optical system is mounted on the primary optical support element.

3. A compact microscope according to claim 2, wherein at least part of the illumination optical system and the return optical system are located in different planes of the compact microscope.

4. A compact microscope according to claim 3, wherein the detection apparatus is supported by the primary optical support element.

5. A compact microscope according to claim 2, wherein at least part of the illumination optical system and the return optical system comprises a secondary optical support element supported by the primary optical support element.

6. A compact microscope according to claim 2, wherein the illumination section comprises a connection to receive an optical fibre connected to a light source.

7. A compact microscope according to claim 2, wherein the detection apparatus comprises a photodetector.

8. A compact microscope according to claim 2, wherein the detection apparatus comprises an imaging apparatus.

9. A compact microscope according to claim 2, wherein the illumination optical system comprises beam shaping optics to control the shape of an illumination light beam.

10. A compact microscope according to claim 9, wherein the illumination optical system comprises at least one aperture to control the shape of an illumination light beam.

11. A compact microscope according to claim 2, wherein the return optical system is operable to separate returned light into at least a first wavelength band and a second wavelength band.

12. A compact microscope according to claim 11, wherein the detection apparatus comprises a photodetector and wherein the return optical system directs returned light in a first wavelength band to a first area of the imaging apparatus and returned light in a second wavelength band to a second area of the imaging apparatus.

13. A microscope system comprising a compact microscope according to claim 2, and an illumination source module, the illumination optical system of the compact microscope and the illumination source module being connected by an optical fibre.

14. A microscope system according to claim 13, wherein the illumination source module comprises a laser source.

15. A microscope system according to claim 14, wherein the illumination source module comprises a first laser source to generate a first illumination light beam having a first wavelength and a second laser source to generate a second illumination light beam having a second wavelength, and a beam combination optical system to transmit the first illumination light beam and second illumination light beam to the optical fibre.

16. A microscope system according to claim 14, further comprising a focus stability beam optical system to direct a focus stability beam to the objective lens system and wherein the illumination source module comprises a focus stability beam laser source and a focus stability beam optical fibre to transmit the focus stability beam to the compact microscope.

17. A compact microscope according to claim 1, further comprising a focus stability beam optical system to direct a focus stability beam to the objective lens system.

18. A compact microscope according to claim 17, comprising a focus controller having a reference image of the focus stability beam, and being operable to receive a subsequent image of the focus stability beam from the objective lens system and control the moveable sample stage in accordance with the reference image and subsequent image.

19. A compact microscope according to claim 18, wherein the subsequent image of the focus stability beam is received from the light detection apparatus.

* * * * *